United States Patent
Williamson et al.

(10) Patent No.: US 9,451,035 B2
(45) Date of Patent: *Sep. 20, 2016

(54) PUSH-BASED LOCATION UPDATE

(71) Applicant: Apple Inc., Cupertino, CA (US)

(72) Inventors: Richard Williamson, Los Gatos, CA (US); Christopher Blumenberg, San Francisco, CA (US); Seejo Pylappan, Cupertino, CA (US); James Howard, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/585,499

(22) Filed: Dec. 30, 2014

(65) Prior Publication Data

US 2015/0120873 A1    Apr. 30, 2015

Related U.S. Application Data

(63) Continuation of application No. 12/486,532, filed on Jun. 17, 2009, now Pat. No. 8,930,438.

(51) Int. Cl.
*G06F 15/16* (2006.01)
*H04L 29/08* (2006.01)
(Continued)

(52) U.S. Cl.
CPC ............. *H04L 67/18* (2013.01); *H04L 63/107* (2013.01); *H04W 4/02* (2013.01); *H04W 4/028* (2013.01); *H04W 60/00* (2013.01)

(58) Field of Classification Search
CPC .................................................. H04L 63/107
USPC ........................................ 709/203, 238, 242
See application file for complete search history.

(56) References Cited

U.S. PATENT DOCUMENTS 7,089,301 B1    8/2006  Labio et al.
7,221,937 B2    5/2007  Lau et al.
(Continued)

FOREIGN PATENT DOCUMENTS

CN    101106415    1/2008
CN    101115302    1/2008
(Continued)

OTHER PUBLICATIONS

Google, Google Mobile—Latitude for your phone [online], [retrieved on Jun. 29, 2009]. Retrieved from the Internet <URL: http://google.com/mobile/default/latiude.html>, 2 pages.
(Continued)

*Primary Examiner* — Adnan Mirza
(74) *Attorney, Agent, or Firm* — Fish & Richardson P.C.

(57) ABSTRACT

Methods, systems, and computer-readable media for a location information server to gather location updates by sending location-update-requests through a push notification service to a mobile device are disclosed. The mobile device provides location updates in response to the push-based location-update-requests received through the push notification service. The mobile device can switch from a self-initiated location update mode to a push-based location update mode depending on the current state of the mobile device. The mobile device can also choose an appropriate positioning system for self-locating based on the information embedded in the location-update-request received through the push notification service. The information embedded in the pushed location-update-request can be a precision requirement or context information that can be used to determine a precision requirement for the location update.

19 Claims, 15 Drawing Sheets

(51) Int. Cl.
*H04L 29/06* (2006.01)
*H04W 4/02* (2009.01)
*H04W 60/00* (2009.01)

(56) References Cited

U.S. PATENT DOCUMENTS

| | | |
|---|---|---|
| 7,460,860 B2 | 12/2008 | Sherman et al. |
| 8,930,438 B2 | 1/2015 | Williamson et al. |
| 2003/0037110 A1 | 2/2003 | Yamamoto |
| 2007/0142059 A1 | 6/2007 | Wang |
| 2008/0095092 A1 | 4/2008 | Kim |
| 2008/0113671 A1 | 5/2008 | Ghozati et al. |
| 2008/0132251 A1 | 6/2008 | Altman et al. |
| 2008/0172496 A1 | 7/2008 | Middleton et al. |
| 2010/0325194 A1 | 12/2010 | Williamson et al. |
| 2011/0069676 A1 | 3/2011 | Perras et al. |

FOREIGN PATENT DOCUMENTS

| | | |
|---|---|---|
| CN | 101388860 | 3/2009 |
| EP | 1 773 024 A1 | 4/2007 |
| EP | 1 986 456 A2 | 10/2008 |
| WO | WO 2004/080096 A2 | 9/2004 |
| WO | WO 2008/036676 A2 | 3/2008 |
| WO | WO 2008/051929 A2 | 5/2008 |

OTHER PUBLICATIONS

FierceWireless, "Press Release: loopt Lets Sprint Customers Keep in Touch with Friends Using GPS on Select Sprint and Nextel Phones," [retrieved on Jun. 29, 2009]. Retrieved from the Internet <URL: http://www.fiercewireless.com/node/10148/print>, 2 pages.

Mologogo, "What is Mologogo," [received on Jul. 22, 2009]. Retrieved from the Internet <URL: http://www.mologogo.com/faq.jsp>, 2 pages.

NPR, "GPS is Smartening Up Your Cell Phone," [retrieved on Jun. 29, 2009]. Retrieved from the Internet <URL: http://www.npr.org/templates/story/story.php?storyId=6097216>5 pages.

SFGate, "The Technology Chronicles: Where you at? Sprint users know," [retrieved on Jun. 29, 2009]. Retrieved from the Internet <URL: http://www.sfgate.com/cgi-bin/blogs/techchron/detail?blogid=19&entry_id=18648>, 3 pages.

USAToday, "Disney Mobile Family Cellphone Service Helps Parents Keep Track of Kids," [retrieved on Jun. 29, 2009]. Retrieved from the Internet <URL: http://www.usatoday.com/tech/columnist/edwardbaig/2006-07-26-disney-mobile_x.htm>, 3 pages.

Zdnet, "iPhone is about to get a whole lot more social," [retrieved on Jun. 29, 2009]. Retrieved from the Internet <URL: http://blogs.zdnet.com/social/?p=517>, 2 pages.

Patentability Search Report, for "User Location System and Interface," dated Apr. 13, 2009, 18 pages.

European Authorized Officer J. Veloso González, Notification of Transmittal of the International Search Report and the Written Opinion of the International Searching Authority, or the Declaration for Application No. PCT/US2010/039015, dated Jan. 3, 2011, 18 pages.

"Secure User Plane Location Architecture; Draft Version 2.0, Mar. 18, 2008; OMA-AD-SUPL-V2_0-20080318-D; Open Mobile Alliance", Internet Citation, Mar. 18, 2008, pp. 1-57, XP007912186, Retrieved from the Internet: URL:http://member.openmobilealliance.org/ftp/Public_documents/LOC/Permanent_documents/OMA-AD-SUPL-V2_0-20080318-D.zip [retrieved on Mar. 12, 2010].

Office action issued in Chinese application No. 201080027212.9 on Nov. 20, 2013, 8 pages.

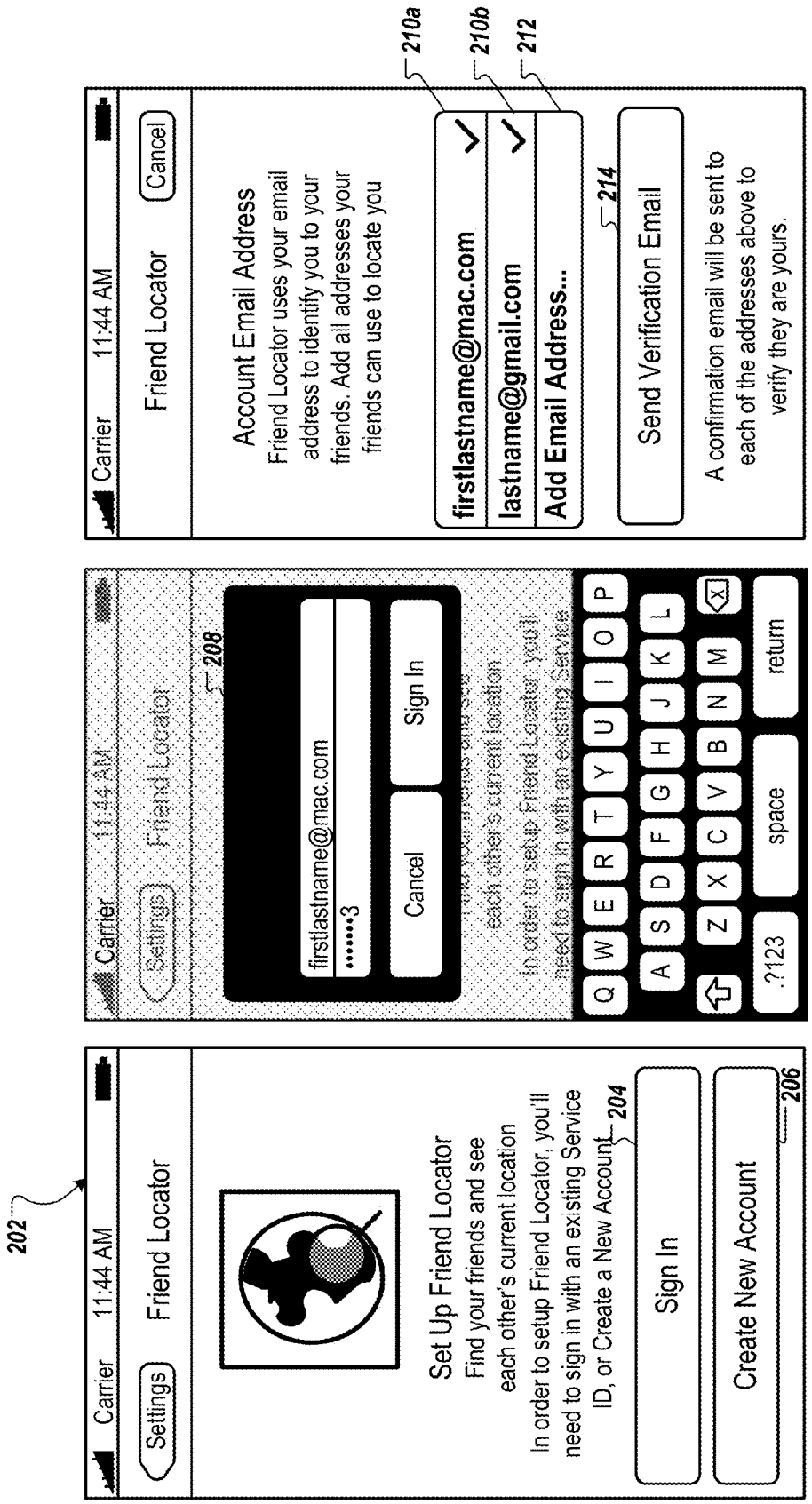

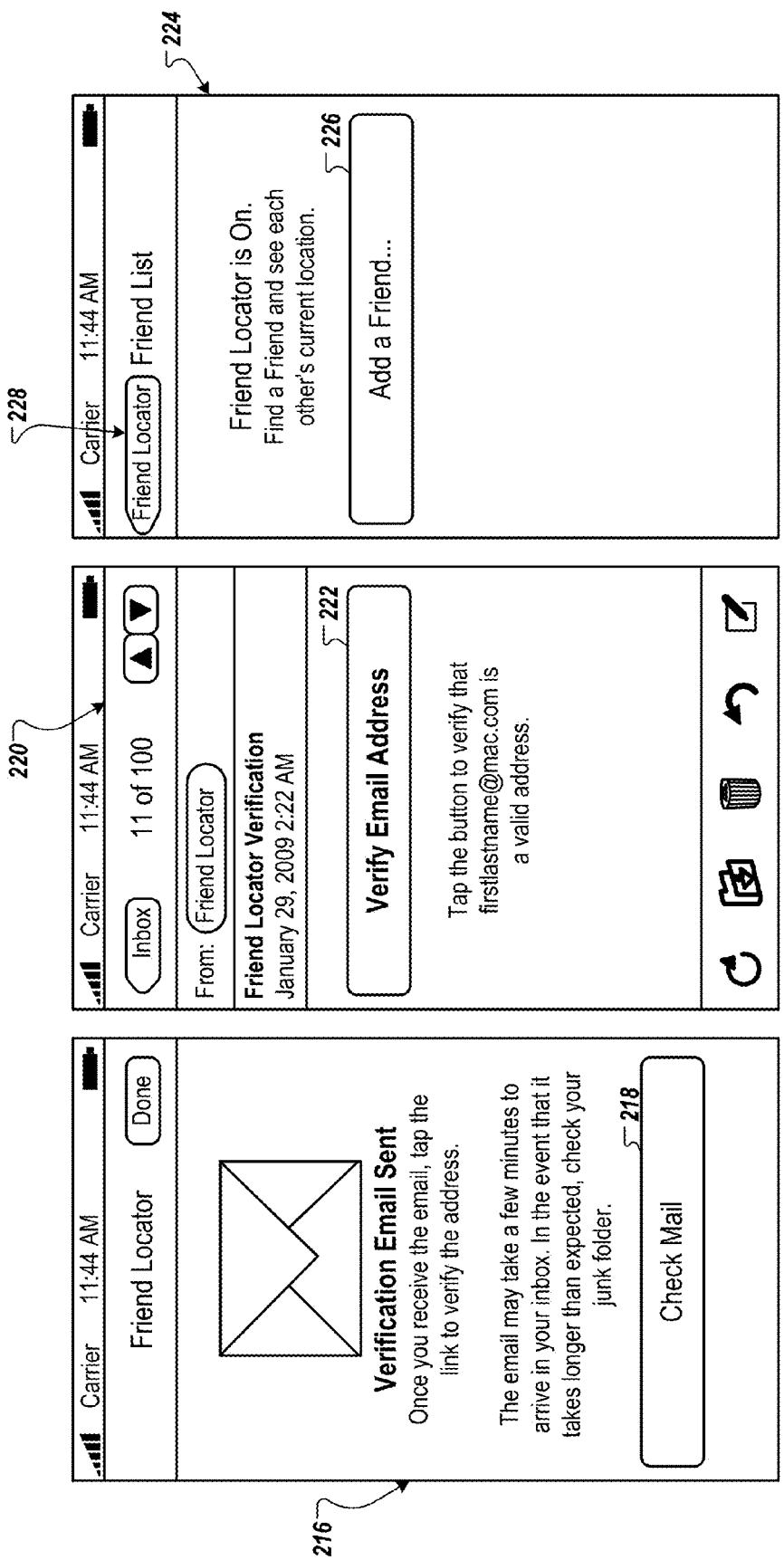

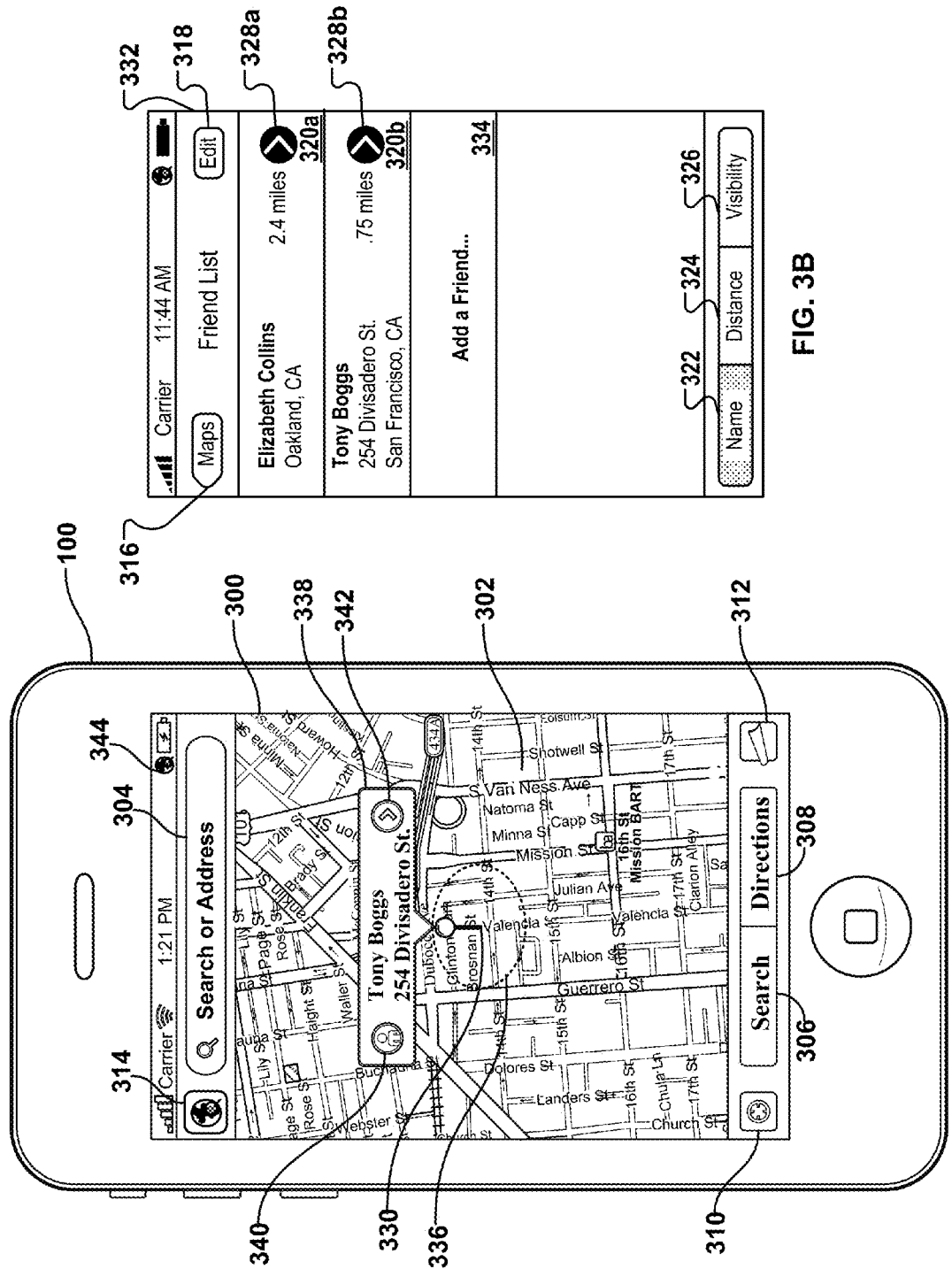

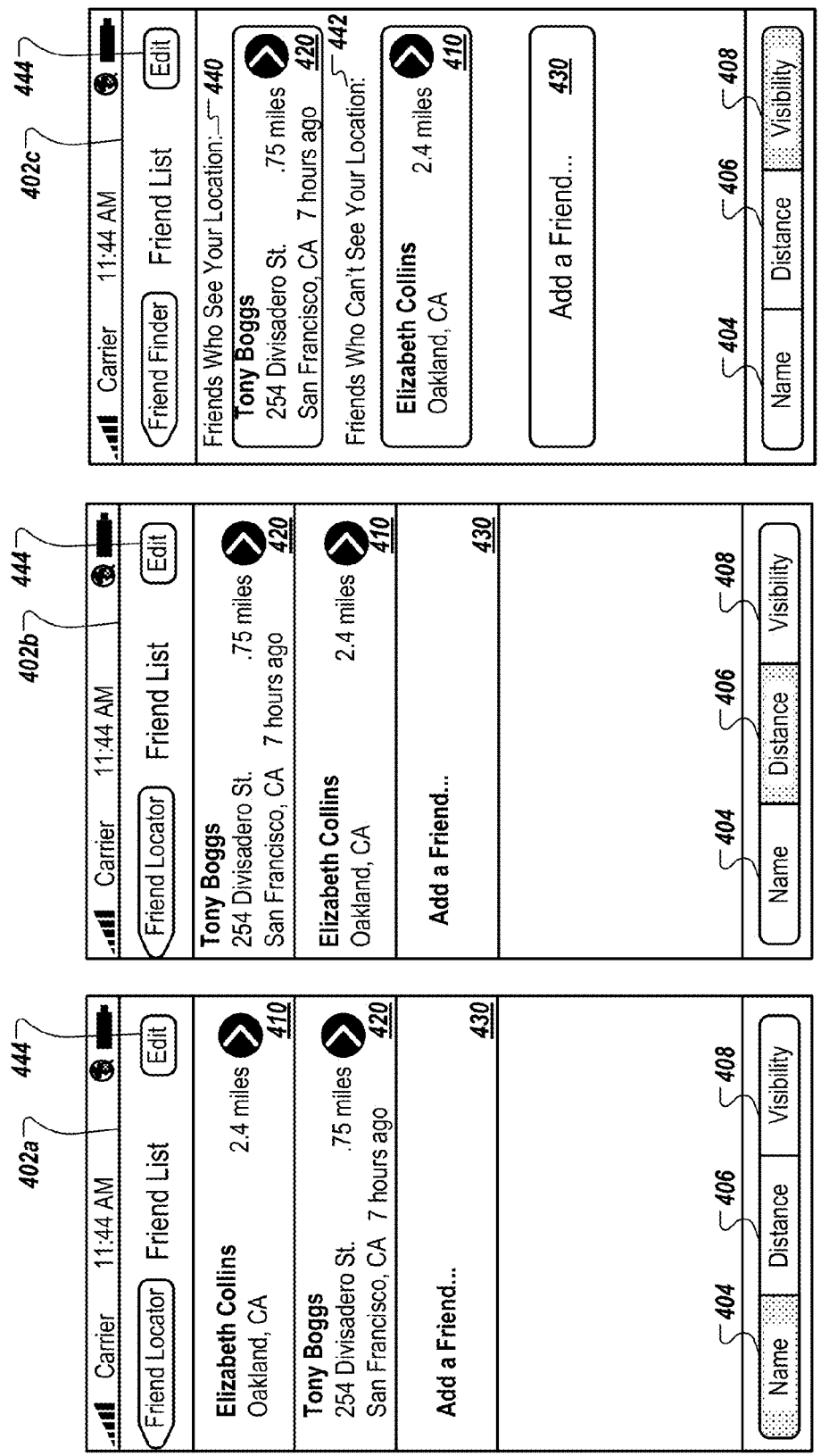

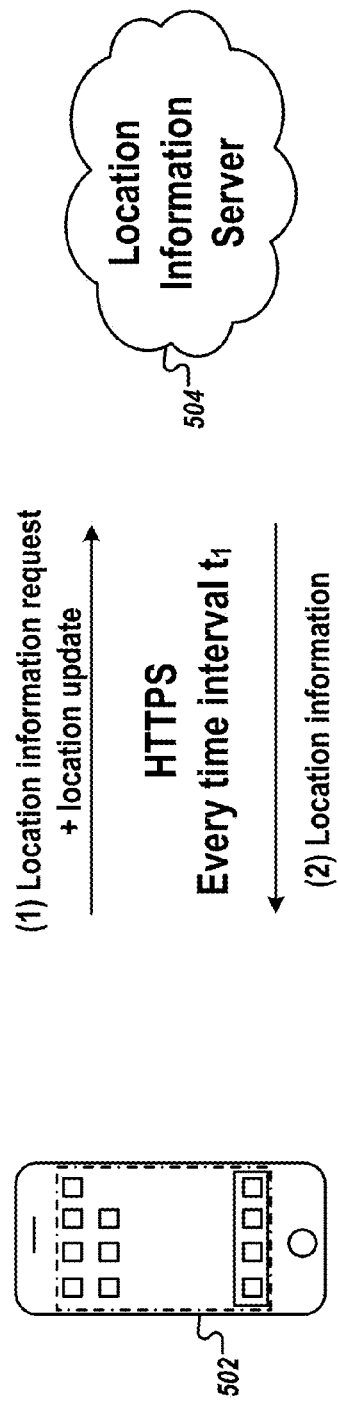
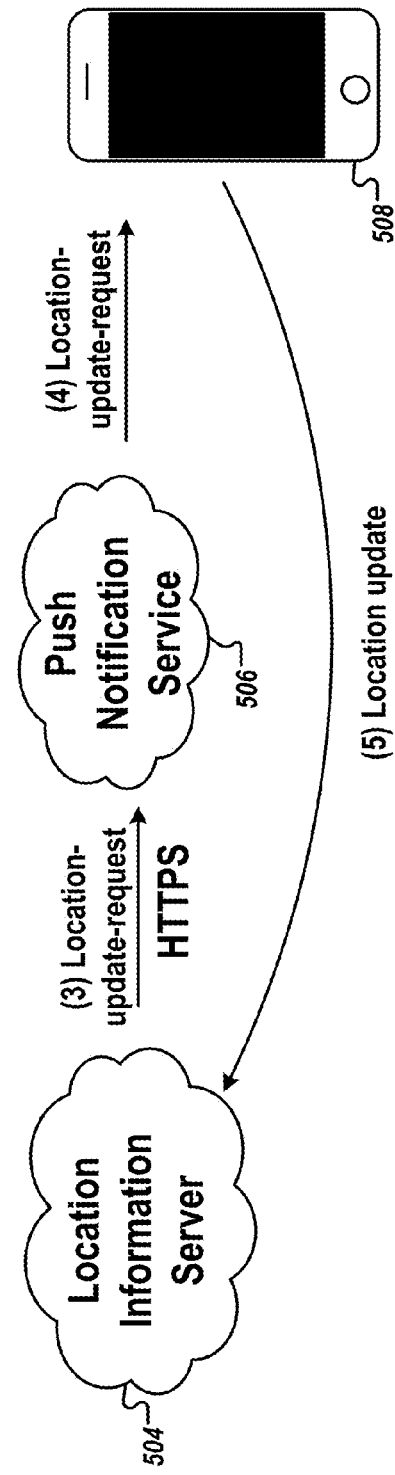
FIG. 5A
FIG. 5B

PUSH-BASED LOCATION UPDATE

This application is a continuation of and claims priority to U.S. application Ser. No. 12/486,532 filed on Jun. 17,2009, the entire contents of which are incorporated herein by reference.

TECHNICAL FIELD

This subject matter is generally related to location information updates for mobile devices.

BACKGROUND

Some mobile devices include a positioning system, such as a Global Positioning System (GPS), to determine a user's current geographic location and display a map showing a marker for the user's current geographical location. As the user moves to a different location, the positioning system recalculates the current location of the user, and refreshes the displayed map to reflect the updated location of the user.

Some mobile devices also allow location-sharing among users who have agreed to become "location-sharing friends" with one another. For example, two users can register with a location information server and agree to share their geographical locations with each other. The location information server maintains a database of location information submitted by the respective mobile devices associated with the two users. The location information server will forward the location information of one user to the other user either upon request, on a schedule, or upon receiving a submission of a location update. Each user can view the location-sharing friend's location on a map displayed on the user's own mobile device.

To keep the location information stored in the location information database up-to-date, the location-sharing mobile devices periodically recalculate their respective current positions and submit location updates to the location information server. To submit periodic location updates to the location information server, a location-sharing mobile device has to maintain an active background process for location determination and update submission regardless of whether other devices request such up-to-date information from the location-information server. Maintaining such active background process consumes power and shortens battery life significantly even if the device is not otherwise in use.

SUMMARY

Systems, methods, and computer-readable media for collecting location information update are disclosed.

In one aspect, for a location-information server, a location-information-request is received from a first client device for location information of a second client device. Upon the location-information-request being received, a location-update-request for a location update is sent from the location-information server to the second client device. Then, the location update is received from the second client device.

In some implementations, before the location-update-request is sent, it is determined whether a stored location information of the second client device is stale according to one or more predetermined criteria. The location-update-request is sent to the second client device if the stored location information is determined to be stale.

In some implementations, the one or more predetermined criteria specify a threshold age for the location information.

In some implementations, the location-update-request is sent to the second client device through a push notification server.

In some implementations, a location precision requirement for the location update is specified in the location-update-request.

In some implementations, the location precision requirement is determined based on a context of the location-information request, where the context includes information indicative of an interest level shown by a user of the first client device.

In one aspect, for a location-information server, a location-information-request is received from a first client device for location information of a second client device, the first client device and the second client device being location-sharing friend devices of each other. The location-information-request is responded to by the location-information server sending a stored location of the second client device to the first client device. It is determined whether the stored location of the second client device is above a predetermined threshold age. If the stored location is above the predetermined threshold age, a location-update-request for a location update is sent to the second client device through a push-notification service. The location update is received from the second client device. The stored location of the second client device is updated according to the received location update.

In some implementations, a location precision requirement for the location update is specified in the location-update-request.

In some implementations, the updated stored location is sent to the first client device in response to a second location-information-request from the first client device for the location information of the second client device.

In some implementations, the updated stored location is sent to the first client device through a push notification service without waiting for a second location-information-request from the first client device for the location information of the second client device.

In one aspect, a location-sharing mobile device enters a sleep mode. While in the sleep mode, the location sharing mobile device receives a location-update-request for a location update from a location-information server through a push notification service. Upon receiving the location-update-request, the location-sharing mobile device activates a positioning system to self-locate. The location-sharing mobile device sends a location update to the location-information server, where the location update includes a current location determined by the positioning system. The location-sharing mobile device returns to the sleep mode after sending the location update.

In some implementations, the location-update-request specifies a location precision requirement for the location update. An appropriate positioning system selected to be activated based on the location precision requirement and according to one or more predetermined criteria.

In some implementations, the one or more predetermined criteria specify a low power consumption preference for the positioning system to be selected.

In some implementations, the location-update-request was sent in response to a location-information-request for location information made by a friend device of the location-aware mobile device, where the location-update-request includes context information related to the location-information-request, and the one or more predetermined criteria specify a location precision preference for the positioning system to be selected based on the context information.

In one aspect, a location-sharing mobile device enters a first state. The location-sharing mobile device sends location information to a location-information server periodically while the location-sharing mobile device is in the first state. The location-sharing mobile device enters a second state. The location-sharing mobile device ceases to submit location information to the location-information server when the location-sharing mobile device enters the second state. While in the second state, the location-sharing mobile device receives a location-update-request for a location update from the location-information server through a push notification service. In response to the location-update-request, the location-sharing mobile device activates a positioning system to self-locate. The location-sharing mobile device submits a location update to the location information server, where the location update includes a current location determined by the positioning system. The location-sharing mobile device returns to the second state after the location update is sent.

In various implementations, the methods and systems disclosed in this specification may offer one or more of the following advantages.

For example, using a push-based location update mechanism, a location-aware mobile device does not have to maintain a background process to recalculate its location and submit a location update to a location-information server periodically, or on a schedule, if no other devices are requesting the current location of the mobile device. Nor does the location-aware mobile device have to provide a location information update upon every significant location change if no other device is requesting the current location of the mobile device. Rather, the mobile device can enter a sleep mode until it is awakened by a location-update-request sent from a location-information server. The location-information server can push the location-update-request to the mobile device when the location-information server has received a request from a "friend" device of the mobile device for the current location of the mobile device, the "friend" device being a device that is sharing locations with the mobile device. Since the location-update-request is sent to the mobile device through a push notification service, the mobile device can remain in the sleep mode to conserve power when no other devices are requesting its current location.

The location-information server can also limit the maximum frequency that a location-update-request is issued to a mobile device so that even if the location information of the mobile device is requested by its friend devices at a high frequency, the mobile device is not overwhelmed by location-update-request. The push-based location-update mechanism balances the need for friend devices to receive up-to-date location information and the need for the mobile device to conserve energy and extend its battery life.

In some implementations, the mode of location update used by a mobile device can automatically switch between a self-initiated-location-update mode and a push-based-location-update mode. For example, if a mobile device is currently running an application related to location-sharing (e.g., a maps application), the mobile device can enter the self-initiated-location-update mode. In the self-initiated-location-update mode, the location-aware mobile device can calculate its location and provide location information updates on a schedule (e.g., every 30 seconds) or upon other trigger events, such as a significant location change. On the other hand, if the location-aware mobile device is not currently running an application related to location-sharing, the mobile device can enter a push-based-location-update mode. In the push-based-location-update mode, the self-locate capabilities (e.g., GPS, or other positioning systems and software processes) can stay inactive until a pushed location-update-request is received from the location information server. In many cases, the mobile device can go into a sleep mode while keeping a communication channel open to receive the pushed location-update-requests. By automatically switching between self-initiated-location-update mode and the push-based-location-update mode based on the state of the mobile device, energy savings can be achieved with minimal compromise in information accuracy.

In some implementations, the push-based-location-update mechanism can be supported by an existing push notification service infrastructure used for other applications (e.g., email, instant messaging, and so on) running on the location-sharing mobile devices. No separate push notification infrastructure needs to be developed. The location-information server sends the location-update-requests to a mobile device through a push notification server that is already in connection with the mobile device.

In some implementations, the pushed location-update-requests can specify a precision level required of the location information in the location update. The required precision level can be based on the request by a friend device of the particular mobile device. The required precision level can also be based on the context from which the request for location information is made by the friend device. For example, the context may include information such as the particular application that the friend device is using to locate the mobile device, the category of relationship between the friend device and the mobile device, and so on. Other information indicative of user's interest in the location information of the mobile device may also be used to determine a required precision level for the location information in the location update.

Based on the level of precision required in the pushed location-update-request, a mobile device can employ an appropriate positioning system that uses the least amount of energy to supply the level of location precision required.

In some implementations, a pushed location-update-request can include context information related to a location request, and the mobile device can supply location information of varying levels of precision based on the context information and one or more user-defined criteria. For example, the pushed location-update-request can identify the location-sharing friend requesting the location information, and the mobile device can supply location information of different precisions (e.g., street level precision, city level precision, etc.) based on the identity of the location-sharing friend. The user can also provide different kinds of responses based on the context information embedded in the pushed location-update-request. For example, based on the identity of the location-sharing friend, the user can supply a true location, a false location, or an "information unavailable" response. Since the location-information server may not have control over the user-specified criteria and responses, the push-based location-update mechanism can promote user privacy and autonomy.

The details of one or more embodiments of the subject matter described in the specification are set forth in the accompanying drawings and the description below. Other features, aspects, and advantages of the subject matter will become apparent from the description, the drawings, and the claims.

DESCRIPTION OF DRAWINGS

FIGS. 2A-2F show example user interfaces for activating and configuring location-sharing on a mobile device.

FIG. 3A is an example user interface presenting a street map showing a marker for a location-sharing friend.

FIG. 3B is an example user interface presenting a list of location-sharing friends.

FIGS. 4A-4E show example user interfaces for viewing and managing the list of location-sharing friends.

FIG. 5A illustrates an example process for a location-aware mobile device to request location information of its friend devices and to submit its own location information in a self-initiated-location-update mode.

FIG. 5B illustrates an example process for a location information server to send location-update-requests through a push notification service to a location-aware mobile device in the push-based-location-update mode.

DETAILED DESCRIPTION

Example Mobile Device

Figure 1:
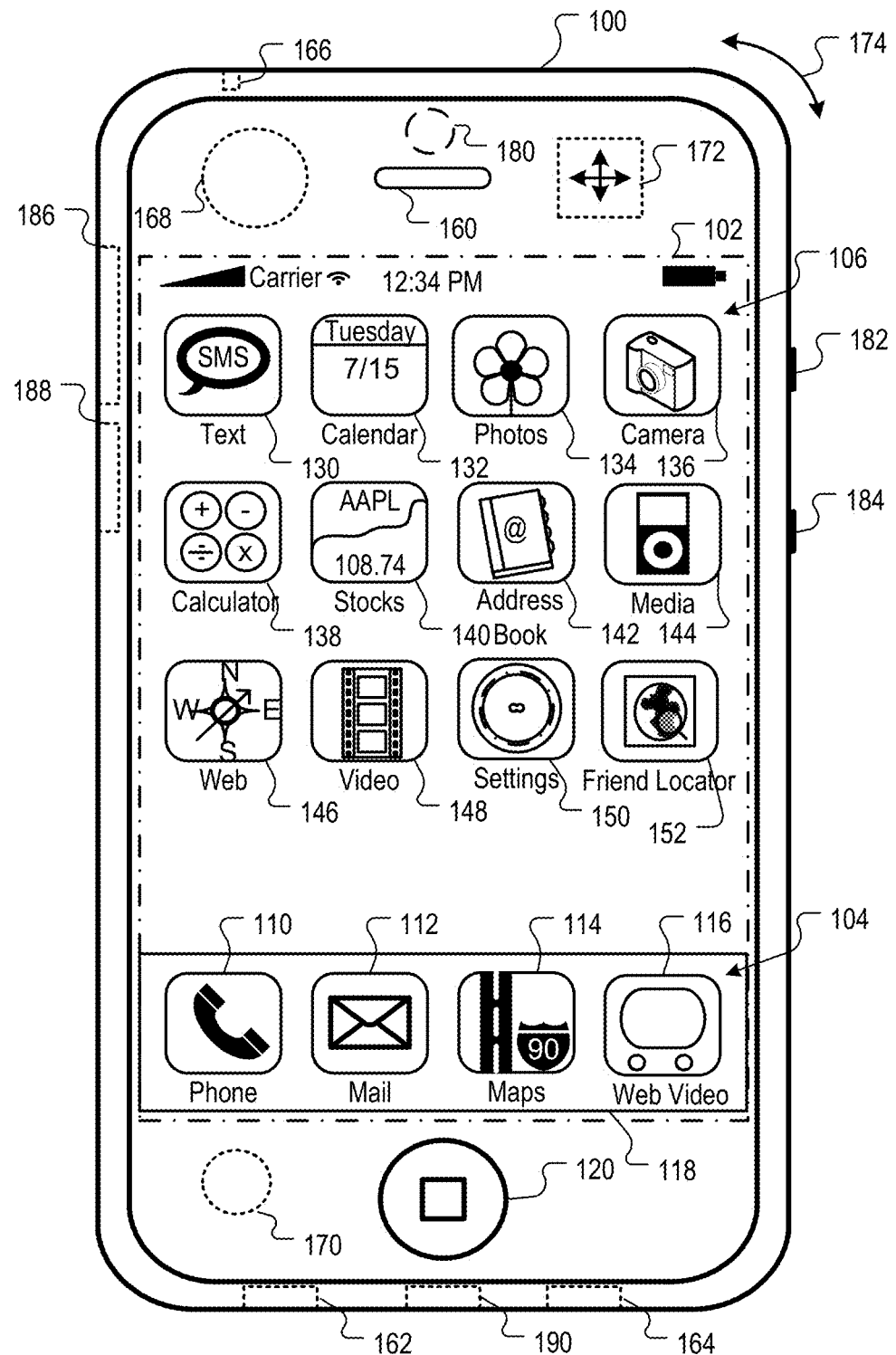
FIG. 1 is a block diagram of an example location-aware mobile device.

FIG. 1 is a block diagram of example mobile device 100. The mobile device 100 can be, for example, a handheld computer, a personal digital assistant (PDA), a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes touch-sensitive display 102. The touch-sensitive display 102 can be implemented with liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise multi-touch-sensitive display 102. The multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323, 846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by phone object 110; an e-mail device, as indicated by e-mail object 112; a map devices, as indicated by Maps object 114; a Wi-Fi base station device (not shown); and a network video transmission and display device, as indicated by Web Video object 116. In some implementations, particular display objects 104, e.g., the phone object 110, the e-mail object 112, the Maps object 114, and the Web Video object 116, can be displayed in menu bar 118. In some implementations, device functionalities can be accessed from a top-level graphical user interface, such as the graphical user interface illustrated in FIG. 1. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, the mobile device 100 can be configured as a base station for one or more devices. As such, the mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Maps object 114 may cause the graphical user interface to present display objects related to various maps functions; and touching the media player object 116 may cause the graphical user interface to present display objects related to various web video functions.

In some implementations, the top-level graphical user interface environment or state of FIG. 1 can be restored by pressing button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as short messaging service (SMS) object 130, calendar object 132, photos object 134, camera object 136, calculator object 138, stocks object 140, address book object 142, media player object 144, Web object 146, video object 148, settings object 150. Touching the SMS display object 130 can, for example, invoke an SMS messaging environment and supporting functionality; likewise, each selection of a display object 132, 134, 136, 138, 140, 142, 144, 146, 148, and 150 can invoke a corresponding object environment and functionality.

In some implementations, the top-level graphical user interface can include display object 152 for a dedicated location-sharing application. The location-sharing application provides the functionalities associated with signing up for a location-sharing service, selecting other users (e.g., friends and/or contacts of the user) with whom that the user wishes to share location, and managing various aspects of location-sharing of the mobile device 100. The mobile device 100 can be in communication with a location information server to receive location information of other devices that are currently sharing locations with the mobile device 100. The mobile device 100 can also be in communication with the location information server to provide its own location to the location information server.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, speaker 160 and microphone 162 can be included to facilitate voice-enabled functionalities, such as phone and voice mail functions. In some implementations, up/down button 184 for volume control of the speaker 160 and the microphone 162 can be included. The mobile device 100 can also include on/off button 182 for a ring indicator of incoming phone calls. In some implementations, loud speaker 164 can be included to facilitate hands-free voice functionalities, such as speaker phone functions. Audio jack 166 can also be included for use of headphones and/or a microphone.

In some implementations, proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, ambient light sensor 170 can be utilized to facilitate adjusting the brightness of the touch-sensitive display 102. In some implementations, accelerometer 172 can be utilized to detect movement of the mobile device 100, as indicated by directional arrow 174. Accordingly, display objects and/or media can be presented according to a detected orientation, e.g., portrait or landscape.

In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that is coupled to the mobile device 100 through an interface (e.g., port device 190) to provide access to location-based services.

In some implementations, the port device 190, e.g., a Universal Serial Bus (USB) port, or a docking port, or some other wired port connection, can be included. The port device 190 can, for example, be utilized to establish a wired connection to other computing devices, such as other communication devices, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

The mobile device 100 can also include camera lens and sensor 180. In some implementations, the camera lens and sensor 180 can be located on the back surface of the mobile device 100. The camera can capture still images and/or video.

The mobile device 100 can also include one or more wireless communication subsystems, such as 802.11b/g communication device 186, and/or Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Location-Sharing Among Location-Aware Mobile Devices

A user of a location-aware mobile device (e.g., mobile device 100) can share his or her location with users of other location-aware mobile devices through a location-information server. A group of users (e.g., at least a pair of users) can sign up for a location-sharing service, and notify the location-information server of their willingness to share locations with one another. The group of users who have signed up to share locations with one another are deemed as a group of location-sharing "friends." The personal relationship between location-sharing friends can encompass social, business, professional, temporary associations, familial, and so on. The respective location-aware mobile devices associated with each of the location-sharing friends are "location-sharing friend devices" or "friend devices" of one another. Each user can set up multiple groups of location-sharing friends, and manage his or her location-sharing with each group individually.

The location of a user can be determined through a location-aware mobile device associated with the user. For example, the location-aware mobile device can be a mobile device (e.g., the mobile device 100) that the user is carrying on his or her person. Each location-aware mobile device can be associated with a user through an identifier (e.g., a cellular phone number, an email address, a user ID, etc.) that the user is using for logging onto a particular network or internet service through the location-aware mobile device.

A location-aware mobile device includes circuitry and sensors for supporting a positioning capability, such as that provided by the global positioning system (GPS). For example, a GPS module or an assisted GPS (A-GPS) module can provide a location of the mobile device in terms of latitude and longitude coordinates. A locator module running on the mobile device can utilize the GPS module and/or other components of the mobile device for positioning. For example, the locator module can invoke the cellular phone component, the WiFi component, the television receiver component, or the radio receiver component to scan for nearby fixed transmitters or signal sources. When signals are received by the mobile device from one or more signal sources with known fixed locations, such as the cellular grids, wireless access points, and radio and TV broadcast towers, the location of the mobile device can be determined to various degrees of precision based on various techniques (e.g., triangulation).

As a more specific example, a mobile device can scan for the nearest fixed cell transmission locations, and determine its own location relative to those fixed cell transmission locations based on the time-of-arrival or the time-difference-of-arrival for the signals from those cell transmission locations. The mobile device can then derive its absolute location based on the known positions of the fixed cell transmission locations.

Other positioning systems and technologies can be implemented on, or coupled to the mobile device to allow the mobile device to self-locate. In some implementations, precision of location determination can be improved to include altitude information. In some implementations, the precision of location determination can be improved. For example, a user's exact location may be determined within building structures using sonar technologies. In such implementations, building structure information may be obtained through a server of such information.

The location-sharing mobile devices can determine their respective locations and submit updates of their respective locations to the location-information server. The location-information server can maintain a database of the submitted location information and can provide the location information of a mobile device to the friend devices of the mobile device. In some implementations, the location-information server can provide the location information upon request by the friend device(s). Alternatively, the location-information server can provide the location information to the friend device(s) when it has received an update of location information from the location-aware mobile device. Alternatively, the location-information server can also provide the location information to the friend device(s) on a schedule (e.g., every 5 minutes). In some implementations, each location-sharing mobile device can specify how it wishes to receive the location information of its friend devices, either by specific requests, on a schedule, or when some predetermined conditions or trigger events are met (e.g., when a significant change in the friend's location has occurred), and so on.

The location information of location-sharing friends and their associated friend devices can be presented and utilized in various applications on a location-sharing mobile device. For example, icons of the location-sharing friend devices can be superimposed on a map displayed on the location-sharing mobile device, indicating the currently known locations of the location-sharing friend devices. As the currently known locations of the friend devices are updated, the user of the location-sharing mobile device can see the icons move accordingly on the map. In some implementations, the user can also place its own icons on the same map using a "self-locate" function of the location-sharing mobile device.

Another example application that can display location information of location-sharing friends of a user is the address book application. If a location-sharing friend is also a contact shown in the user's address book, the currently known location of the location-sharing friend can be displayed in the address book for the contact, along with other address information, such as home address, business address, contact phone numbers, etc.

Sometimes, a dedicated location-sharing application can be implemented to manage location-sharing and review location information of the location-sharing friends. Other applications that utilize location information of location-sharing friends can include games, applications for managing a fleet of vehicles or a team of players, and so on.

Example User Interfaces for Location-Sharing Applications

FIGS. 2A-2F illustrate example user interfaces for allowing a user to sign up for a location-sharing service. After a user invokes the location-sharing application 152 shown in FIG. 1 for the first time, user interface 202 can be displayed, as shown in FIG. 2A. The user interface 202 can be invoked in other ways as well. For example, the Settings menu (invoked by icon 150 in FIG. 1) may contain an item for setting up the location-sharing function on the mobile device 100. The user interface 202 can include a text prompt introducing the location-sharing service to the user. The location-sharing application allows a user to find his or her friends and allows the user and the friends to share each others' current locations. In some implementations, a user needs an ID or an existing account relationship with the location-sharing service provider to sign in. The user can sign in using the existing ID by invoking user interface element 204 or create a new account by invoking user interface element 206.

FIG. 2B shows that the user enters an ID and password combination through user interface element 208. FIG. 2C shows that after the user has entered the account ID, and passed the authentication process, the user is required to select one or more email addresses by which friends of the user can use to identify the user and share their locations with the user. The user can select multiple email addresses to identify him or herself to friends (e.g., email address 410a and 410b). Each email address can be given to a different group of people for easy management. For example, the user can temporarily turn on or off (as indicated by the existence of the checkmarks next to the email addresses) a particular email address to terminate the association between this mobile device and that particular email address. The group of friends who use the particular email address to share-location with the user will not be able to locate the user using this mobile device. The user can enter additional email addresses by invoking user interface element 212. After the user has entered the desired email addresses for self-identification, the user can invoke user interface element 214 to send a verification email to each of the specified email addresses 210. The verification process is for ensuring that the user enters his or her own email addresses and are not posing as others.

FIG. 2D shows that once the verification emails are sent, user interface 216 can prompt the user to check his or her emails to locate the verification emails from the location-sharing service provider. User interface element 218 can link the user to the user's email inbox.

FIG. 2E shows a verification email in the user's email inbox 220. The email contains user interface element 222, such as a link or button, for the user to click and verify the receipt of the email. Once the location-sharing service provider receives notification from the user interface element 222, the location-sharing service is activated for this user. The user can now send out requests for location-sharing to friends using the verified email address.

FIG. 2F shows notification 224 from the location-sharing service provider that the location-sharing service is now activated for this particular user and for the verified email address. The user can proceed to add friends into a list of location-sharing friends by invoking user interface element 226. The user can also proceed to go to the dedicated location-sharing application by invoking user interface element 228.

FIG. 3A is an example user interface 300 for a maps application running on a mobile device (e.g., mobile device 100). The user interface 300 presents street map 302 superimposed with marker 330 for the currently known location of a location-sharing friend of a user associated with the mobile device. FIG. 3B is an example user interface 332 presenting a list of friends that are currently sharing locations with the user associated with the mobile device.

The example user interface 300 can include one or more of the following user interface elements for presenting information and receiving user inputs for the maps application: user interface element 304 for receiving a search term or address, user interface element 306 for invoking a search interface with more address search options, user interface element 308 for invoking a directions interface for getting directions, user interface element 310 for obtaining the current location of the mobile device (e.g., self-locate) and identify the current location on the map, and user interface element 312 for starting a page curl animation to reveal options related to the maps application.

In some implementations, the street map 302 displayed in the user interface 300 can be any map showing roads, streets, and/or paths in an area. For example, the street map displayed can be an aerial photograph of the area represented, a road atlas, a regular map showing city streets and roads, a map showing the grounds of a facility or building, or a map showing key landmarks. The map can also be displayed according to different zoom levels specified by the user.

In some implementations, the user interface 300 further includes user interface element 314 related to location-sharing. A user can invoke the user interface element 314 to display a list of location-sharing friends (e.g., user interface 332 shown in FIG. 2B) to be displayed on the mobile device.

The example user interface 332 shown in FIG. 2B includes user interface element 316 for returning to the maps user interface 302. The example user interface 332 can further include user interface element 318 for editing the location-sharing friend list and configuring the overall location-sharing options (e.g., changing the login ID and/or email addresses associated with the mobile device). Information about each location-sharing friend of the user (e.g., 320a and 320b) such as their respective names, currently known locations, and distances from the mobile device is listed in the example user interface 332. The list of location-sharing friends can be sorted according to name, distance, or visibility by selecting the corresponding user interface elements 322, 324, and 326. Visibility refers to whether the user of the mobile device is currently hiding from each location-sharing friend. If the user is hiding from a particular location-sharing friend, the user can still see the current location of that particular location-sharing friend, but that particular location-sharing friend cannot see the current location of the user. The hiding can be temporary and does not terminate the location-sharing relationship between the user and the particular location-sharing friend. The user can set up the visibility and other location-sharing properties for each location-sharing friend by invoking user interface elements 328 (e.g., 328a and 328b). The example user interface 332 can further include user interface element 334 for adding new friends to the location-sharing friend list.

In some implementations, the user can select a friend (e.g., Tony Boggs) from the list of location-sharing friends, and marker 330 (e.g., in the form of a push pin) for the selected location-sharing friend will be displayed on the map 302. The location of the marker 330 on the map 302 represents the currently known location of the selected location-sharing friend (e.g., Tony Boggs). In some implementations, area 336 is indicated around the marker 330 to show the precision of the location information. A larger area indicates a lower location precision. The area is not necessarily circular, and the size and shape of the area is determined by the particular positioning system employed by the friend device to determine the location.

In some implementations, address bar 338 can be displayed next to the marker 330. The address bar 338 can be annotated with the current location of the selected location-sharing friend (e.g., 254 Divisadero St., San Francisco, Calif.). In some implementations, if the selected location-sharing friend is a known contact of the user (e.g., if his information is already stored in the address book of the mobile device), the address bar 338 displays the name of the selected location-sharing friend (e.g., Tony Boggs) as shown in the address book. If the selected location-sharing friend is not a known contact of the user, the address bar 338 shows the identifier of the selected location-sharing friend registered with the location information service provider (e.g., a verified email address of the selected location-sharing friend).

Figure 4E:
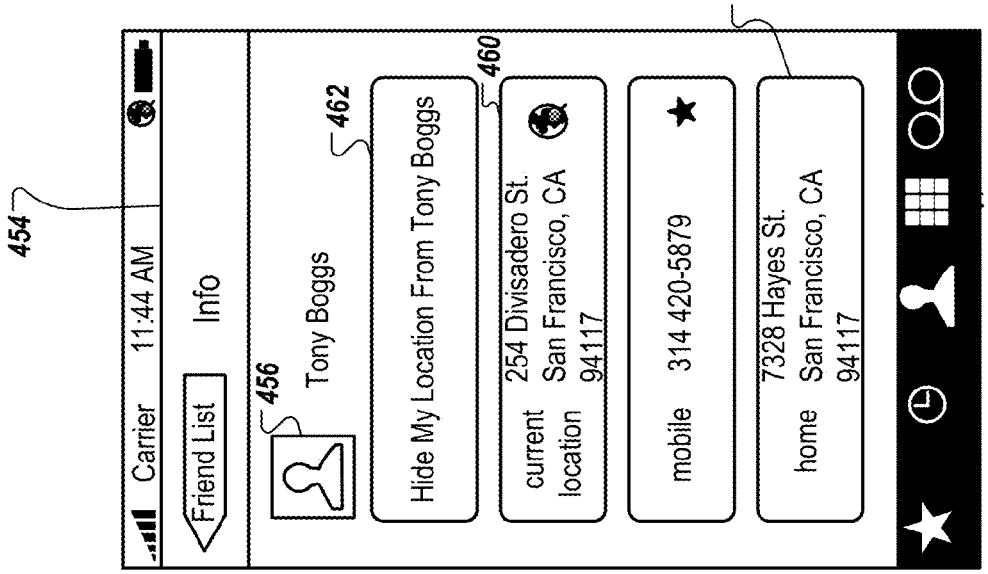
Figure 4D:
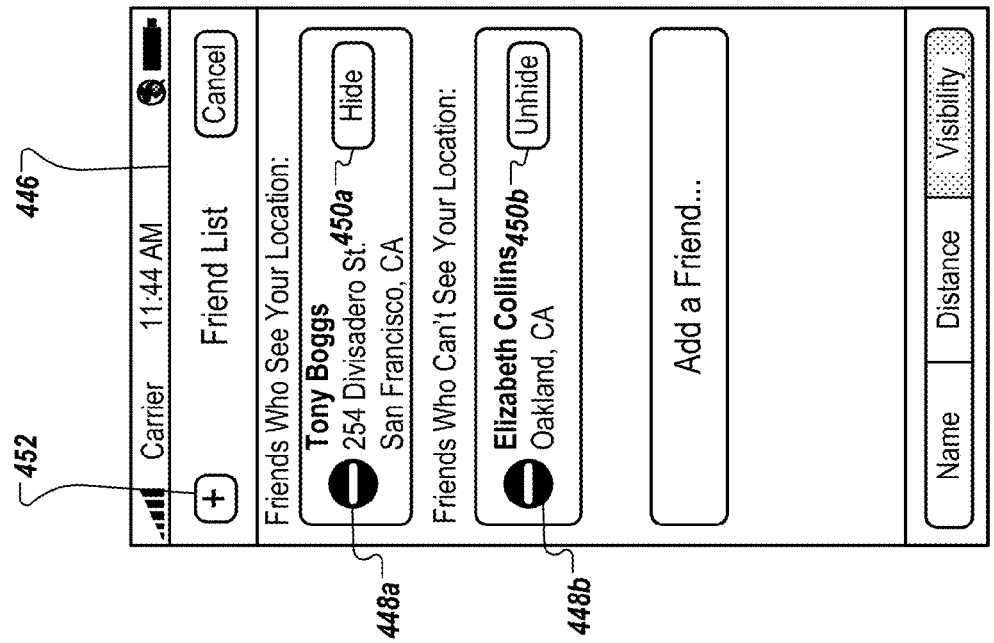

In some implementations, the address bar 338 also includes icon 340 (e.g., an avatar) for the selected location-sharing friend. For example, the user can choose an individualized picture or icon to represent the particular selected location-sharing friend. A user can choose different color schemes for different groups of friends that the user is sharing locations with, e.g., family, friends, coworkers, etc. In some implementations, the address bar 338 also includes user interface element 342 for invoking an address card of the selected location-sharing friend. An example address card is shown in FIG. 4E.

The user interface 300 can also include indicator 344 showing whether location-sharing is currently active on the mobile device. This indicator is a helpful for the user to avoid unintentionally sharing his or her locations with others.

FIGS. 4A-4C show three different views (402a, 402b, and 402c) of an example location-sharing friend list. The friend list can include all other users who have established a location-sharing relationship with the user of the mobile device. The friend list can be invoked from various applications, for example, from a maps application, from an address card, or from a dedicated location-sharing application.

In FIG. 4A, the list contains two location-sharing friends (e.g., Elizabeth Collins and Tony Boggs). The user interface 402a for the friend list also includes three user interface elements 404, 406, and 408, for switching between three different views of the friend list. The user interface element 404 is for displaying the friend list sorted according to the location-sharing friends' names. The user interface element 406 is for displaying the friend list sorted according to the location-sharing friends' distances from the user. The user interface element 408 is for displaying the friend list sorted according to the visibility of the location-sharing friends.

FIG. 4A is the view where the location-sharing friends are sorted according to their names. For each name, additional information, such as the currently known location of the corresponding location-sharing friend, and the distance of the location-sharing friend from the user are also displayed. The currently known location of each location-sharing friend can be of different degrees of precisions. For example, the location for Elizabeth Collins is at a city level, while the location for Tony Boggs is at a street level. The precision of the location information can be determined by various factors, such as the availability of positioning systems on the friend device, friend's specification for precision levels, or precision level requested by the user of the mobile device, the current distance between the user and the location-sharing friend device, and so on.

The user interface 402 shown in FIG. 4A also includes a user interface element (e.g., 410 and 420) for each location-sharing friend in the list. The user interface element 410 or 420 is for invoking additional user interfaces for managing the location-sharing preferences for each individual location-sharing friend. In some implementations, the user interface 402 also includes user interface element 430 for adding a new location-sharing friend to the friend list. When the user interface element 430 is invoked, a user interface for inviting a friend to establish a location-sharing relationship can be displayed. The user can enter an email address or identifier of the friend by which the location information server can identify that friend. The location information server can then send a request to that friend. If that friend accepts the request for location-sharing, then a location-sharing relationship is established between the user and the friend. The friend's name and location information can then be added to the friend list.

FIG. 4B shows a view of the friend list sorted according to distance. For example, Tony Boggs is listed before Elizabeth Collins because the currently known location of Tony Boggs is closer to the user than the currently known location of Elizabeth Collins.

FIG. 4C shows a view of the friend list sorted according to visibility. A user can choose to hide from some of the location-sharing friends in the friend list. When a user chooses to hide from a location-sharing friend, the location-sharing friend no longer receives location information of the user. The list of location-sharing friends can be split into two groups, a first group 440 of location-sharing friends who can see the user's current location on their devices, and a second group 442 of location-sharing friends who cannot see the user's current location on their devices. In this particular example, the user is not hiding from Tony Boggs, and Tony Boggs can see the user current location on his device. On the other hand, the user is hiding from Elizabeth Collins, and Elizabeth Collins cannot see the current location of the user on her device.

The user interface 402 also includes user interface element 444 for editing the friend list. By invoking the user interface element 444, user interface 446 can be displayed.

User interface element 448 (e.g., 448a and 448b) can be displayed next to the entry for each of the location-sharing friends. By invoking the user interface element 448, the location-sharing relationship with a location-sharing friend can be unilaterally terminated by the user. The user would have to go through the same consent process such as the one shown in FIGS. 2A-2F to reestablish the location-sharing relationship. Another user interface element 450 (e.g., 450a and 450b) is for toggling between the hidden and unhidden states. For example, the user is currently not hiding from a first location-sharing friend, Tony Boggs, and the user interface element 450a is for hiding from Tony Boggs. Similarly, the user is currently hiding from a second location-sharing friend, Elizabeth Collins, and the user can invoke the user interface element 450b to unhide from the second location-sharing friend.

The user interface 446 can also include user interface element 452 for logging in using a different login ID. By logging in using a different ID, the mobile device can be associated with a different group of email addresses and location-sharing settings. In some implementations, for location-sharing purposes, each mobile device is uniquely associated with one login ID at a time.

FIG. 4E shows an example address card 454 of a selected location-sharing friend. The address card 454 can be invoked from multiple user interfaces. For example, the address card can be invoked from the address book application on the mobile device. Alternatively, the address card can be invoked from the address bar shown on the map in FIG. 3A. Alternatively, the address card can also be invoked from a dedicated location-sharing application running on the mobile device. Other applications that display locations or contact information can also include user interface elements for invoking the address card 454.

The address card 454 shows user interface element 456 which can display an icon or avatar of the contact. This picture or icon 456 can be chosen by the user of the mobile device or by the contact. The address card 454 also displays the name of the contact (e.g., Tony Boggs). The address card 454 displays the usual address information, such as home address 458 of the contact. The address card 454 also displays the current location of the contact if the contact is also a location-sharing friend of the user. The current location of the contact is displayed in user interface element 460. The address card 454 can further include user interface element 462 for toggling between hiding and unhiding the user's current location from this particular contact depending on the current state of visibility of the user to the particular contact. For example, the user is currently visible to Tony Boggs (i.e., the user is not hiding his location from Tony Boggs), and invoking the user interface element 462 will cause the user's current location to be hidden from Tony Boggs.

Since not all contacts are necessarily a location-sharing friend of the user, therefore, not all address cards include the user interface elements that are specific to location-sharing. If a contact is not a location-sharing friend of the user, the address card can just include the usual contact information.

Location Information Requests and Location Updates by Location-Aware Mobile Devices A location-information server maintains a location information database and provides location information of location-sharing mobile devices to their friend devices. To provide up-to-date information, the location information server typically requires the location-sharing mobile devices to submit updates of their own locations.

Location-sharing mobile devices can implement a background process that periodically determines and submits the mobile device's location to the location-information server. In some implementations, the background process periodically determines the mobile device's own location and submits location updates to the location-information server if a significant change in location has occurred. The time interval between consecutive location determination and location information updates can be set either by the user of the location-sharing mobile device or by the location-information server. In some cases, the frequency of location determination and location updates may be varied depending on a number of heuristics. For example, the location-sharing mobile device may automatically reduce the frequency of location determination and location updates when it detects that the battery powering the device is low. Alternatively, the location-sharing mobile device may automatically reduce the frequency of location determination and location updates during certain hours of the day (e.g, between 2 am-6 am) if most people will not be moving about much during those hours. Other schedules of location-determination and location updates are possible.

Scheduled and/or periodic location determination and updates ensure that the location information stored on the location-information server remains relatively current. The freshness of the location information depends on the frequency of the location determination and update submission. However, because location determination and update submission consume power, if the frequency of location determination and update submission is high, this mode of location update can significantly reduce the battery life of the location-sharing mobile device.

Furthermore, if location updates are submitted at a high frequency while no friend device is interested in the current location of the location-sharing device, this mode of location update wastes power. The heuristics for reducing the frequency of location update submissions can prevent the battery from being depleted completely due to these unnecessary location updates. However, reducing update frequency is not an ideal solution since a low update frequency can result in stale location information, and providing stale information can defeat the purpose of location-sharing.

In this specification, a different location information update mechanism is disclosed. The location-sharing mobile device does not need to maintain a background process to periodically self-locate and provide location update information to the location-information server. When no friend device of the location-sharing mobile device is interested in the current location of the location-sharing mobile device, the location-sharing mobile device can go into a sleep mode and wait for a push-based location-update request from the location-information server. While in the sleep mode, the location-sharing mobile device only provides location update in response to the pushed location-update-request. The location-sharing mobile device can switch between the self-initiated-location-update mode (e.g., periodic update) and the push-based-location-update mode depending on the current state of the location-sharing mobile device.

FIG. 5A illustrates an example process for location-sharing mobile device 302 to request location information of its friend device(s) and to submit its own location information in a self-initiated periodic location update mode. FIG. 3B illustrates an example process for location-sharing mobile device 508 in the push-based-location-update mode to respond to a pushed location-update-request. The pushed location-update-request is sent from location-information server 504 through push notification service 506 to the location-sharing mobile device 508. FIG. 3C illustrates an example process for two location-sharing mobile devices to provide location information updates in a self-initiated-location-update mode.

FIG. 5A shows a scenario where the location-sharing mobile device 502 sends a location-information-request to the location information server 504 for location information of one or more friend devices. The location-information-request can be initiated when the user starts an application that displays the location-information of the one or more location-sharing friends. For example, a location-information-request for location information can be sent when the user is running the maps application which displays a marker for the currently known location of a selected location-sharing friend. For another example, a location-information-request for location information can be sent when the user is running the dedicated location-sharing application and is reviewing the list of location-sharing friends. Other applications and scenarios may also cause a location-information-request for location information to be sent to the location-information server. The location-information-request for location information can be sent in an HTTP or HTTPS request to the location-information server 504. Other network communication protocols can similarly be utilized for the location-information-request. The location-information-request for location information can be resent periodically to refresh the display of the mobile device 502. The time interval $t_1$ for resending the location-information-request is relatively short (e.g., every 30 seconds) to ensure that the latest information available to the location information server 504 is transmitted to the location-sharing mobile device 502.

When the location information server 504 receives the location-information-request from the location-sharing mobile device 502, it can retrieve the requested location information from the location information database and return the requested location information to the location-sharing mobile device 502 in response. In some implementations, the request and response can be encrypted to preserve user's privacy. The location-information server can also verify that the location-sharing mobile device 502 has established location-sharing relationship with the identified friends, and that those identified friends are not currently hiding their current locations from the location-sharing mobile device 502.

When the location-sharing mobile device 502 is actively running a location-sharing related application, the mobile device 502 is already in active communication with the location-information server 504 (e.g., by sending location-information requests every 30 seconds). When the location-sharing mobile device 502 is in active communication with the location-information server 504, the location-sharing mobile device 502 enters a self-initiated-location-update mode. The location-sharing mobile device 502 can determine its own location and submit its location information updates periodically to the location-information server 504 (e.g., every 30 seconds). In some implementations, the location information updates can be piggybacked on the location-information-requests that the location-sharing mobile device 502 is sending to the location-information server 504. This high update frequency is acceptable since the positioning system and computing resources are already active, and there is a high likelihood that the user is interested in the location information and location-sharing.

Such interest justifies the rapid location update frequency and the power consumption for the self-initiated-location-updates.

When the location information sever 504 receives the self-initiated location update submission from the location-sharing mobile device 502, the location information server 504 can update the stored location for the mobile device 502 in the location-information database accordingly. A time stamp can be recorded for the most recent location update submission. The time stamp can be used to compute an age for the stored location for the mobile device 502. When a location-sharing mobile device 502 is already in active communication with the location-information server 504, the stored location information for the mobile device 502 is at most $t_1$ old (e.g., 30 seconds old).

FIG. 5B illustrates an example process for the location-information server 504 to send location-update-requests through the push notification service 506 to the location-aware mobile device 508 in the push-based-location-update mode. FIG. 5B illustrates the scenario where location-sharing mobile devices are not required to periodically submit their own location updates, and the location information stored in the database may have been from a long time ago, and no longer up-to-date. This will occur if no friend device of the location-sharing mobile device 508 has shown any interest in the current location of the location-sharing mobile device 508, and the user of the location-sharing mobile device 508 has not used any location-related applications for a long time. In many cases, the location-sharing mobile device 508 is in a sleep mode.

In this scenario, after the location-information receives indication (e.g., in the form of a location-information-request from the mobile device 502 that the mobile device 502 is interested in the current location of a friend device (e.g., mobile device 508), the location-information server 504 locates the location currently stored in its database and provides the stored location to the mobile device 502 in response to its request. The location information stored in the database may be fresh or out-of-date at this point. The location-information server 504 looks up the age of the most recent location it has stored for the friend device (e.g., mobile device 508). If the age of the most recent location is below a threshold value, for example, 15 minutes, then the location is considered fresh, and the location-information server 504 does not proceed to request updated location information from the friend device (e.g., mobile device 508). If, however, the age of the most recent location stored in the database is above the threshold value, for example, 15 minutes, then the location-information server 504 proceeds to make a location-update-request for location update to the friend device (e.g., mobile device 508) as shown in FIG. 5B. In this scenario, the friend device (e.g., mobile device 508) is not in active communication with the location-information server 504, and that is why the stored location has become stale. The location-information server 504 makes its location-update-request to the friend device (e.g., mobile device 508) through the push notification service 506.

The friend device (e.g., mobile device 508) maintains a persistent connection to the push notification service server 506. The persistent connection is reestablished by the friend device whenever the friend device (e.g., mobile device 508) switches to a different network connection. The persistent connection can be maintained even if the entire device goes into a sleep mode. The friend device (e.g., mobile device 508) can shut down its main processor and all active processes until awakened by a notification from the push notification service 506. Alternatively, the friend device can simply shut down its positioning system and all or some location-related processes until a location-update-request is received through the push notification service 506.

A location-update-request received through the push notification service 506 can wake up the friend device (e.g., mobile device 508), and start a process for location determination and update submission. FIG. 5B shows that the location information server 504 sends the location-update-request for location update to the push notification service 506 through an HTTPS interface, and the push notification service 506 forwards the location-update-request to the friend device (e.g., mobile device 508) through the persistent open connection that exists between the push notification server 506 and the friend device 508. Once the friend device (e.g., mobile device 508) receives the location-update-request through the push notification service 506, the friend device (e.g., mobile device 508) wakes up, makes a determination of its location, and sends a location update to the location-information server 504 directly. The location-information server 504 updates the stored location for the friend device (e.g., mobile device 508) in the database and records a time stamp for the location update.

In some implementations, the location-information server 504 stores the updated location information and waits for the next location-information-request from the mobile device 502, for example, through a resend after 30 seconds. The updated location is sent to the mobile device 502 in response to the next location-information-request. In some implementations, the location-information server 504 can immediately push the location update to the mobile device 502 through the push notification service 506 without waiting for the next location-information-request from the mobile device 502.

The push-based-location-update mechanism allows a location-sharing mobile device to remain dormant when no one is seeking its current location. In some implementations, the dormant location-sharing mobile device only wakes up and sends a location update when it receives a pushed location-update-request from the location-information server. The location-sharing mobile device can go back into the dormant state when it completes the location update in response to the pushed location-update-request. The location information server sends the location-update-request only when it has received indication from a friend device that it is interested in the current location of the location-sharing mobile device and the location stored in the location-information database for that location-sharing mobile device has become stale. Therefore, the need for allowing the location-sharing devices to conserve energy and the need for sending fresh locations to the requesting location-sharing devices are balanced.

If multiple mobile devices are contacting the location-information server for the location of the same friend device, the location information server aggregates these location-information-requests, and only sends one location-update-request to the friend device every fixed time interval $t_2$ (e.g., every 15 minutes). Therefore, the friend device at most wakes up every time interval $t_2$. The time interval $t_2$ is the threshold age for a location to be considered stale. The time interval $t_2$ can be adjusted according to various heuristics. For example, during the day, the time interval $t_2$ can be shortened, and during late-night hours, when people are less likely to move about, the time interval $t_2$ can be extended. The time interval $t_2$ can also be adjusted according to a device's individual settings. In some implementations, the time interval $t_2$ can also be adjusted depending on the device's popularity (e.g., how frequently the device's location is being sought by its friend devices).

The time interval $t_2$ can be adjusted to balance the need for sending fresh locations to friends who are seeking the location of a location-sharing mobile device and the need for the location-sharing mobile device to stay dormant to conserve energy. During the push-based-location-update, the location determination and update submission are carried out in the background and appear transparent to the user. An indicator for location update may be displayed so that user does not unintentionally share his or her locations. This push-based-location-update mechanism can reduce the number of times that a device has to self-locate and provide location updates to the location-information server. Information is only provided when there is an indication that the location information is currently being sought by a friend device.

Figure 5C:
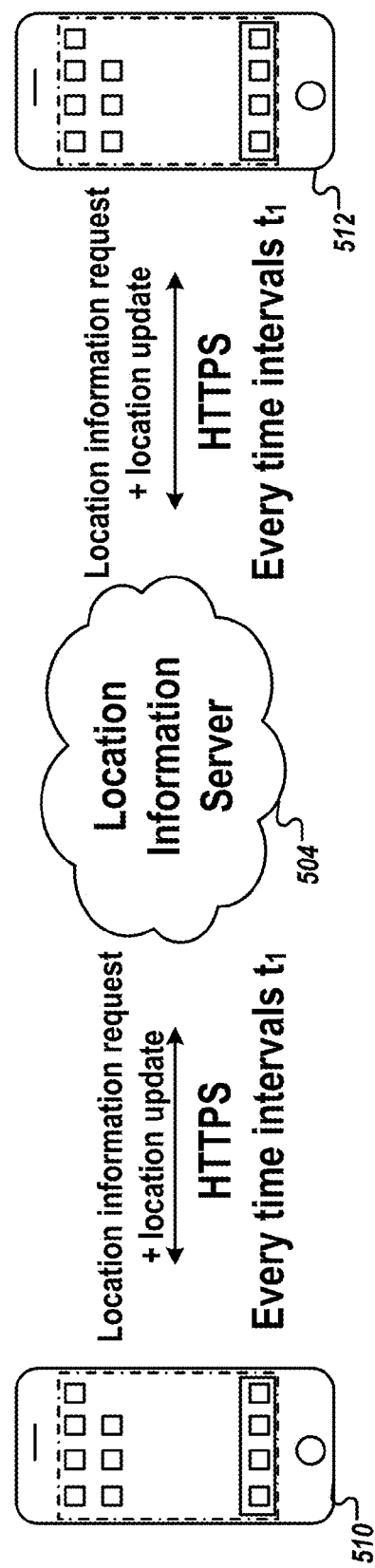
FIG. 5C illustrates an example process for two location-sharing mobile devices to submit location information updates in a self-initiated-location-update mode.

FIG. 5C illustrates an example process for two location-aware mobile devices (510 and 512) that are sharing locations with each other to provide location information updates in a self-initiated-location-update mode. In this scenario, the two friend devices 510 and 512 are both in active communication with the location-information server 504, for example, when they are both using the maps application or the dedicated location-sharing application. Both friend devices 510 and 512 can provide location information updates to the location-information server 504 at a rapid rate (e.g., at every $t_1$=30 seconds). The location information for both mobile devices is fresh, and there is no need for the location-information server 504 to prompt either device for a location update. As both devices are requesting location information and submitting location information at a high frequency, both devices will see each other's movements close to real time.

The location update mechanism for a location-aware mobile device can automatically change when the state of the location-aware mobile device changes.

For example, when the location-aware mobile device is in a first state where it is in active communication with the location-information server for location-related activities, it is in a self-initiated-location-update mode. In this mode, the location-aware mobile device determines its own location and submits location updates periodically or on a schedule. In some implementations, the frequency of location update submissions may be adjusted according to a number of rules or heuristics to optimize energy consumption and efficiency. For example, the frequency may be reduced during certain times during the day (e.g., late night hours) when people are less likely to move about, or when the battery level of the device is low.

When the location-aware mobile device is in a second state where it is not in active communication with the location-information server for any location-related activities, the location-aware mobile device enters the push-based-location-update mode. In this mode, the location-aware mobile device ceases to self-locate and no longer provide location updates to the location-information server. The self-locate and location update submission functions can remain dormant indefinitely until the user invokes a location-related application or when the location-aware mobile device receives a location-update-request from the location-information server through the push notification service. When the location-aware mobile device receives a location-update-request, it can invoke the self-locate functionality and submit its current location to the location-information server. Afterwards, the location-aware mobile device can remain in the push-based-location-update mode. While in this mode, the location-aware mobile device does not self-locate or provide location update until the next location-update-request is received or if the user of the mobile devices invokes the location-related application.

Figure 6:
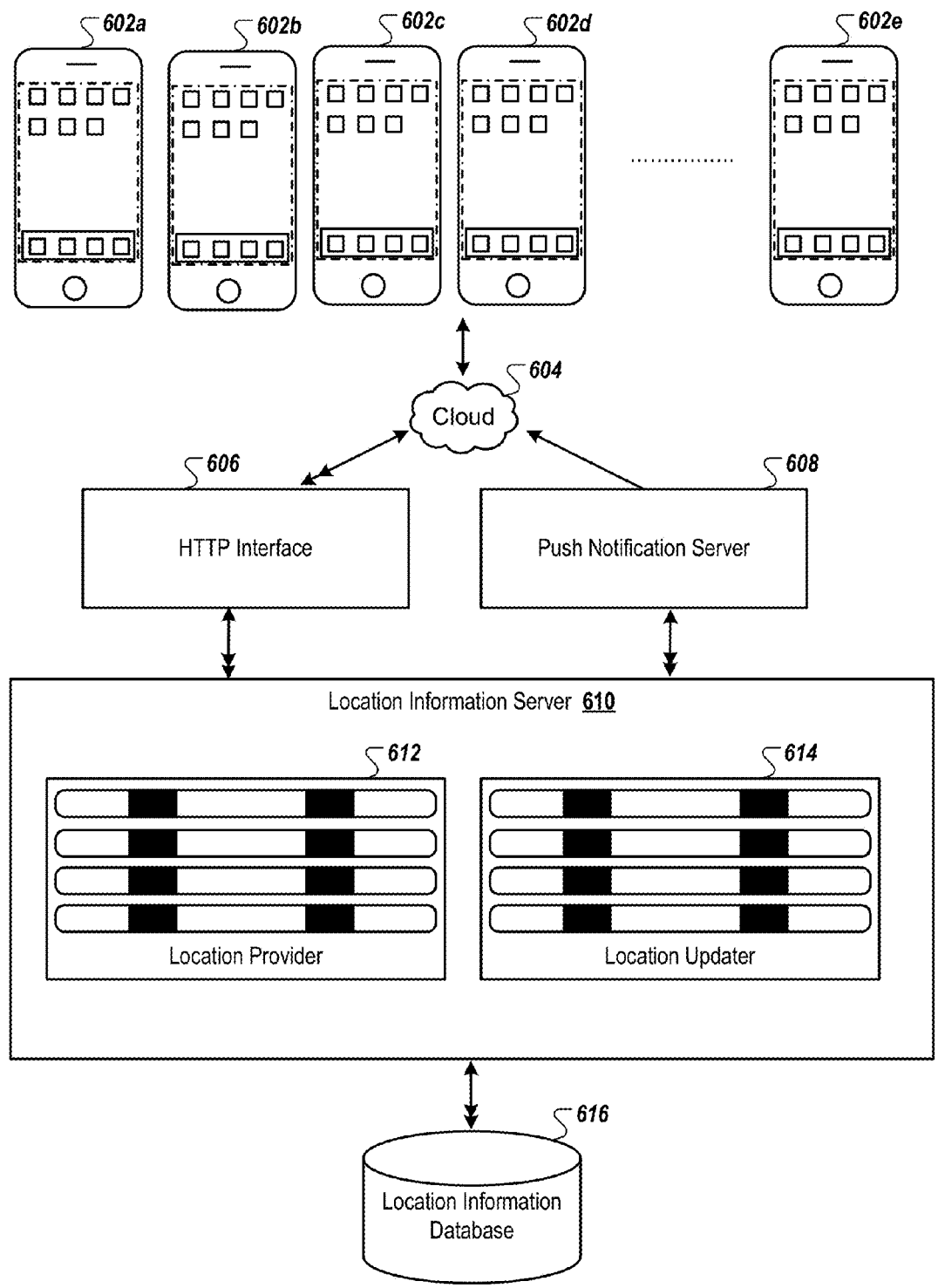
FIG. 6 illustrates an example system that supports location-sharing and push-based location update.

FIG. 6 illustrates an example system that supports location sharing and push-based-location-update. The system includes client devices 602 (e.g., 602a, 602b, 602c, 602d, and 602e). The client devices 602 are location-aware mobile devices that are registered with location-information server 610 for location-sharing. Each client device is associated with a particular user. For example, a user of a location-aware mobile device 602a can log onto the location-information server 610 on the mobile device 602a using a unique identifier for the location-information service. Each of the client devices is a friend device of one or more other client devices. Each client device can identify its friend devices by their associated email addresses which are stored by the location-information server 610.

A user of a client device (e.g., 602a) can provide an indication to the location-information server 610 that he or she is interested in knowing a particular location-sharing friend's location. The indication can be expressed in a location-information-request sent from a maps application or a dedicated location-sharing application when the user is reviewing the location information of the location-sharing friend. When the client device (e.g., 602a) submits the location-information-request for location information to the location-information server 610, it can also submit its own location to the location-information server 610. At this time, the client device (e.g., 602a) is in active communication with the location-information server 610, and location-information-requests and location updates are sent on a schedule. The schedule can be a periodic schedule with a frequency of 30 seconds per request/update. The location-information-requests and location updates can be provided to the location-information server 610 through HTTP or HTTPS interface 606 over one or more available networks 604. The one or more available networks 604 can include, for example, the WiFi network and/or the cellular network.

The location-information server 610 can include two subcomponents, location provider 612 and location updater 614. The location information server 610 also maintains location information database 616. The location-information server 610 receives location-information-requests for location information from the registered location-sharing mobile devices 602. The location-information server 610 identifies the requesting and targeted mobile devices for the location-information-requests and verifies the location-sharing authorization and settings for the requesting and targeted mobile devices. If the authorization check is verified, the location provider 612 can retrieve the stored location for the targeted mobile device (e.g., 602b) in the location information database 616 and provide the retrieved location information to the requesting mobile device (e.g., 602a) through the HTTP interface 606 and the one or more available networks 604. The location-information server 610 can also determine whether the retrieved location information is fresh. If the age of the retrieved location information is above a predetermined threshold (e.g., 15 minutes), the location information can be deemed stale, and the location updater 614 will send a location-update-request to the targeted friend device (e.g., 602b) through the push notification server 608.

The push notification server 608 has the ability to push updates and notifications to the client devices 602 which maintain persistent open connections with the push notification server 608. The persistent connections remain open even when the mobile devices 602 go into a sleep mode. In the sleep mode, the main processor of a mobile device can shut down, and no active background process needs to be executed. The push notification server can send notification through the persistent connection to the mobile device. The notification can wake up the mobile device or certain components of the mobile device if the mobile device is in the sleep mode. For example, the push notification service can be used to push updates for email inboxes, calendars, and other applications, without the device initiating a check for updates. The push notification server 608 can send information or notification immediately rather than to wait for the mobile device to initiate a request for the information or notification.

When a mobile device (e.g., 602b) receives a location-update-request from the location updater 614 through the push notification server 608, the mobile device (e.g., 602b) can invoke a process to determine its own location. The location determination can be accomplished using a GPS module, or other positioning systems available to the mobile device. Once the mobile device determines its current location, it sends the location information to the location updater 614. The location updater 614 receives the location information update and can update the stored location information in the location information database 616. The location updater 614 can also record a time stamp for the location update. After the mobile device finishes sending the location information update, the process for location determination and location update can terminate. The mobile device can go back to the sleep mode.

The push notification server 610 can be a general purpose server that is utilized by a number of applications. Some applications use the push notification server 610 to provide updates or new information as the updates and new information become available. For example, the push notification server 610 can forward new emails, new short messages to the mobile devices as well. In this disclosure, the location information server 610 uses the push notification server 608 as a way to send a location-update-request to the mobile device.

In addition to waking up the location-determination and update submission processes on a mobile device, the location-update-request can further include information that can help the mobile device decide the precision of the location determination and update. The mobile device can self-locate using a number of positioning technologies, such as using a GPS system on the mobile device or coupled to the mobile device. Additional positioning technologies include triangulation using cellular grids, WiFi access points, radio or TV broadcast towers, etc. These different positioning systems provide different levels of precision and consume different amount of energy and resources. Information in the location-update-request can be used to choose an appropriate positioning system that provides sufficient location precision while using the least amount of energy.

In some implementations, the pushed location-update-request specifies the required level of precision for the location information in the location update submission. In some implementations, the pushed location-update-request includes information that allows the mobile device to determine a precision level for location information based on local settings. The location precision requirement can be determined using a number of predetermined rules and/or heuristics.

For example, since the positioning based on cell-grid triangulation consumes less power, a preference can be given to positioning based on cell-grid triangulation. Alternatively, since GPS provides a more accurate location fix, a preference can be given to positioning based on GPS. In some implementations, the preference for power saving versus location precision can be specified by the user. In some implementations, the preference can change based on the time of day. For example, accuracy can be preferred during the daytime hours, and power conservation can be preferred during nighttime hours. Other heuristic-based preferences can be used to balance the need for accuracy and the need for power conservation.

In some implementations, the location updater 614 can specifies a location precision requirement in the location-update-request according to the information it has about the particular context from which the location-information-request is sent. For example, if a user is viewing the friend list in the dedicated location-sharing application or maps without specifically selecting any location-sharing friend, the location-update-request can specify a low location-precision-requirement, such as a cellular grid location fix. However, if a user zooms in on a particular location-sharing friend, for example, by clicking on the friend's icon in maps or in the friend list, a location-update-request for location update can specify a higher location-precision-requirement. In response, the targeted friend device will activate the GPS system for self-locate, and provide the GPS location fix to the location updater 614.

In some implementations, an initial location-update-request can specify a low location-precision first, and if the returned location update indicates that the requesting device and the targeted device are within a certain distance, then, a follow-up location-update-request specifying a higher location-precision-requirement can be sent.

In some implementations, the location updater 410 may request a higher-precision location fix from the targeted device if the users associated with the requesting device and the targeted device share a calendar event within a window of time for the calendar event.

In some implementations, the location-information server may set a higher location-precision-requirement in the location-update-request if the user of the requesting device views the information for the targeted friend for an extended period of time, e.g., more than 30 seconds. This may indicate that the user of the requesting device is interested in seeing a more precise location fix of the targeted friend.

In some implementations, the location-information server may set a location-precision-requirement based on explicit instruction from the user requesting the information. For example, when a user selects a location-sharing friend in a location-related application, the user may be offered an option to specify a desired precision for the location information.

In some implementations, the targeted device may decide on the precision of location fix that it will provide to the location updater 614. For example, the selected location precision may be based on a number of user-specified rules. The rules can also be heuristically determined. For example, GPS position fix can be preferred when GPS is already operating. For another example, a cell fix can be preferred when GPS is not already active. For another example, GPS can be preferred when the battery level is above a threshold level and cell fix can be preferred when the battery level is below a threshold level. For another example, a user may individually specify the level of precision for location information available to each location-sharing friend, such as city level, street level, etc. In some implementations, the user can individually set the level of location precision for each group of location-sharing friends.

In some implementations, the targeted device may select the precision of location fix based on the information in the pushed location-update-request. For example, the pushed location-update-request may include context information related to the application that was used to send the location-information-request. The location-update-request may also include context information related to the user(s) that are currently requesting the location information.

The location-information server can provide location information to third party applications through a program API. Location information may be made available to a device or software process as long as the targeted mobile device consents. In some implementations, the device requesting the location information does not have to be a location-aware device itself. For example, a client device requesting the location information of other location-aware mobile devices can be a manager device that monitors the locations of the different location-aware mobile devices. In some implementations, non-mutual location sharing can be implemented, where a manager device can display location-information of a group of "subordinate" location-sharing mobile devices, but the location of the manager device is not shared with the "subordinate" location-sharing mobile device. Other uses of the location information are possible through the API.

Figure 7A:
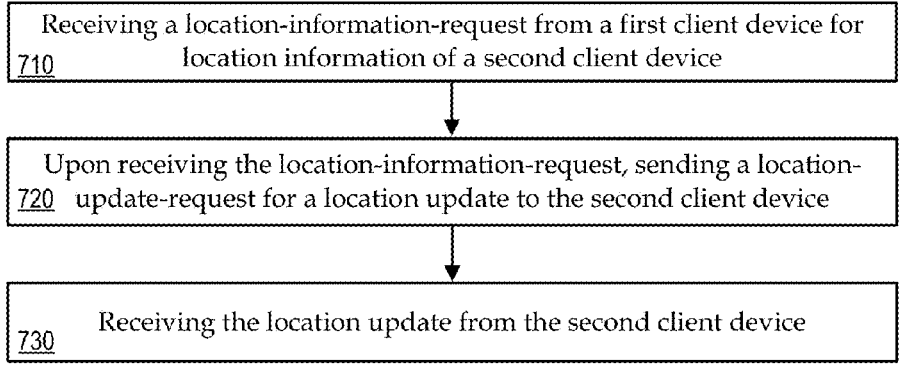
FIGS. 7A-7B are flow diagrams of an example process for sending a location-update-request to a location-sharing mobile device.
Figure 7B:
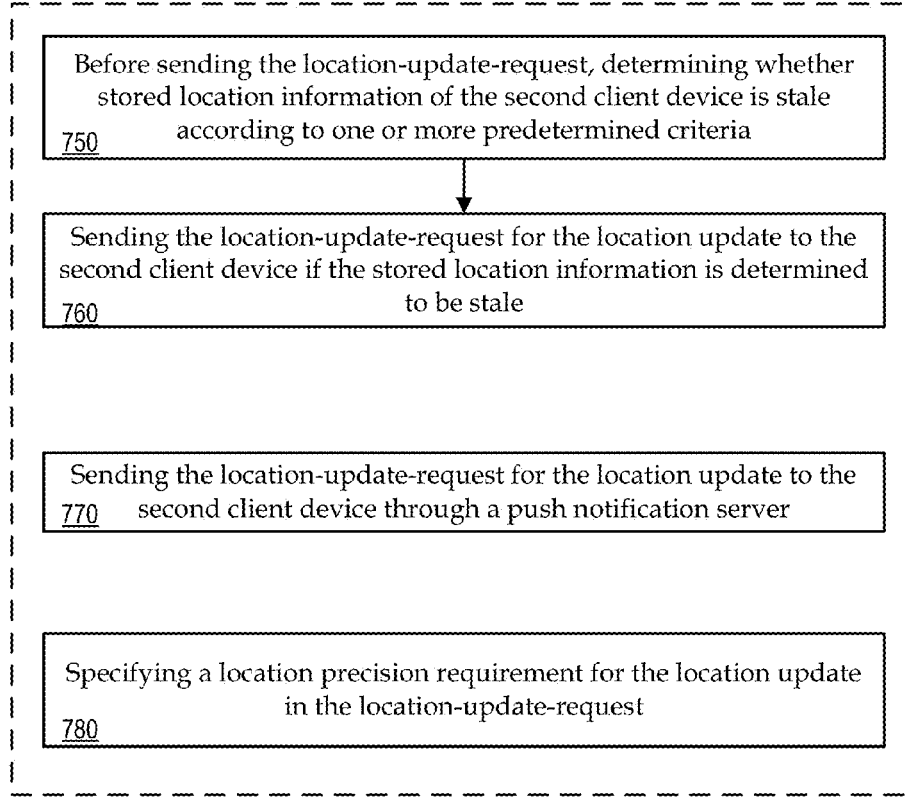

FIGS. 7A-7B are flow diagrams of an example process 700 for sending a location-update-request to a location-sharing mobile device by a location information server.

In FIG. 7A, the process can start when a location-information-request is received from a first client device for location information of a second client device (710). The first client device and the second client device are location-sharing friend devices registered with a location-information server. The location-information-request can be sent from the first client device (e.g., the requesting client device) when a user associated with the first client device selects to view the location information of a location-sharing friend associated with the second client device.

Upon receiving the location-information-request, a location-update-request for location update can be sent to the second client device (720). Specifically, once the location-information server receives the location-information-request from the first client device, it can immediately forward the stored location information for the second client device to the first client device. However, if it determines that the stored location information has become stale, it can also send a location-update-request to the second client device for a location update. The stored location can be updated by the location-information server, when the location update is received from the second client device (730).

In some implementations, before sending the location-update-request, the location-information server can first determine whether the stored location information of the second client device is stale according to one or more predetermined criteria (750). The location-information server only sends the location-update-request for a location update to the second client device if the stored location information is determined to be stale (760). If the stored location is not stale, the location-information server can refrain from sending a location-update-request to the second client device. In some implementations, the one or more predetermined criteria specify a threshold age for the location information. If the age of the stored location information is above the threshold, the stored location information is considered stale, and an update is required. Otherwise, no update is required at this time. In some implementations, the one or more criteria may specify a time period when no location-update-requests should be sent to the second client device, so no stored location would be considered stale during this time period regardless of the age of the information.

In some implementations, the location-update-request for location update can be sent to the second client device through a push notification server (770). The push notification server is capable of waking up the second client device even if the second client device is in a sleep mode. The second client device can go into the sleep mode while keeping a persistent connection open to the push notification server. Since the connection can be maintained using much less power than keeping an active background process running on the mobile device, energy savings can be achieved.

In some implementations, the location-information server can send the location-update-request and specify a precision requirement for the location update in the location-update-request (780). In some implementations, the location-information server can determine the precision requirement for the location update based on a context of the location-information-request received from the first client device. The context includes information indicative of an interest level shown by a user of the first client device. For example, the context can include information identifying the particular application from which the location-information-request was sent. The context can also include information stating the duration that the user of the first client device has been viewing the location information of the friend associated with the second client device. Other context information indicative of the user's interest in a high-precision location fix is possible.

Figure 8:
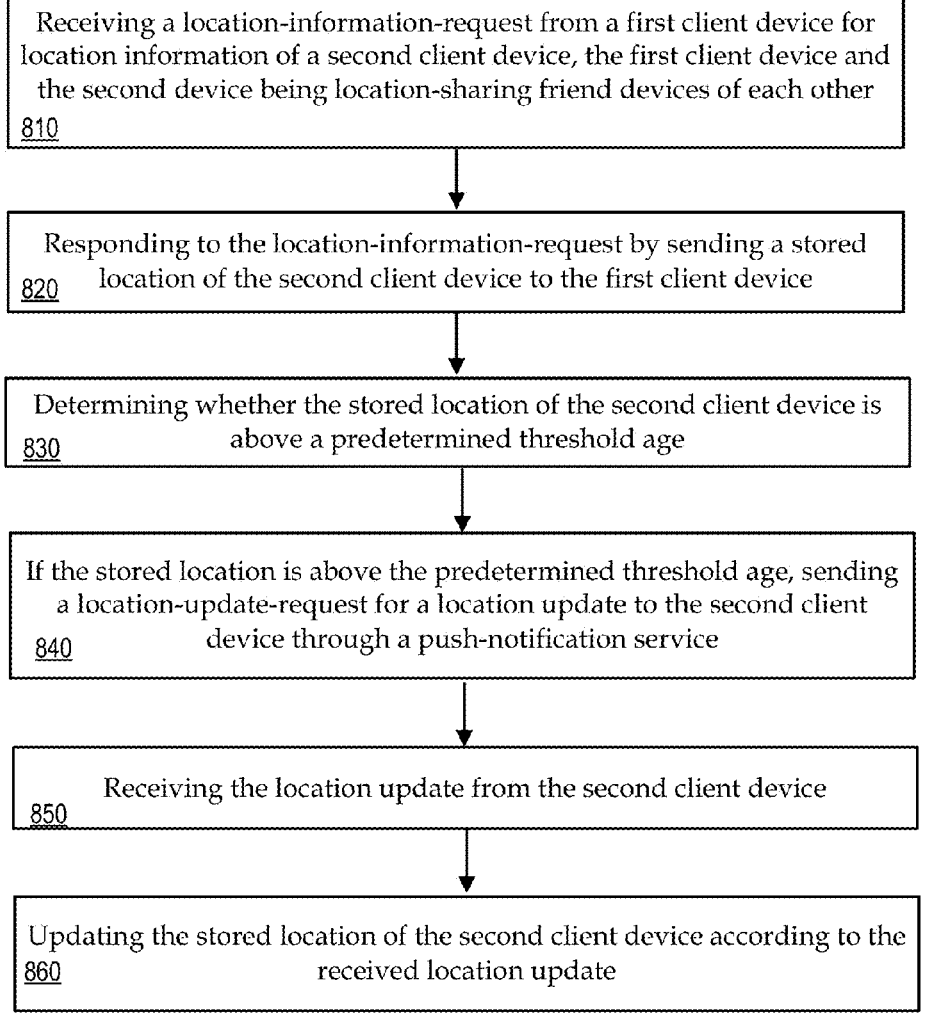
FIG. 8 is a flow diagram of another example process for sending a location-update-request to a location-sharing mobile device.

FIG. 8 is a flow diagram of another example process 800 for sending a location-update-request to a location-sharing mobile device by a location-information server.

The process can start when the location-information server receives a location-information-request from a first client device for location information of a second client device, the first client device and the second device being location-sharing friend devices of each other (810). The location-information server can respond to the location-information-request by sending a stored location of the second client device to the first client device (820). The location-information server can then determine whether the stored location of the second client device exceeds a predetermined threshold age (830). If the stored location exceeds the predetermined threshold age, the location-information server can send a location-update-request for location update to the second client device through a push-notification service (840). The location-information server can then receive a location update submission from the second client device (850). The location-information server can update the stored location of the second client device according to the received location update submission (860).

In some implementations, when sending the location-update-request, the location-information server also specifies a location-precision-requirement for the location update in the location-update-request.

In some implementations, the location-information server can send the updated stored location to the first client device in response to a second location-information-request from the first client device for the location information of the second client device. The first client device typically resends a location-information-request as the displayed location information on the first client device is refreshed (e.g., every 30 seconds). The location-information server can send the updated location information in response to the new location-information-request from the first client device. The first client device now has the most updated location information of the second client device.

In some implementations, the location-information server can send the updated stored location to the first client device through a push notification service without waiting for a second location-information-request from the first client device for the location information of the second client device. For example, the first client device may also maintain a persistent open connection with the push notification server to receive pushed updates or new information. The location-information server can use the push notification server to send the received location update to the first client device as soon as the update becomes available. Therefore, the first client device can see the updated location of the second client device without having to resend the location-information-request.

Figure 9:
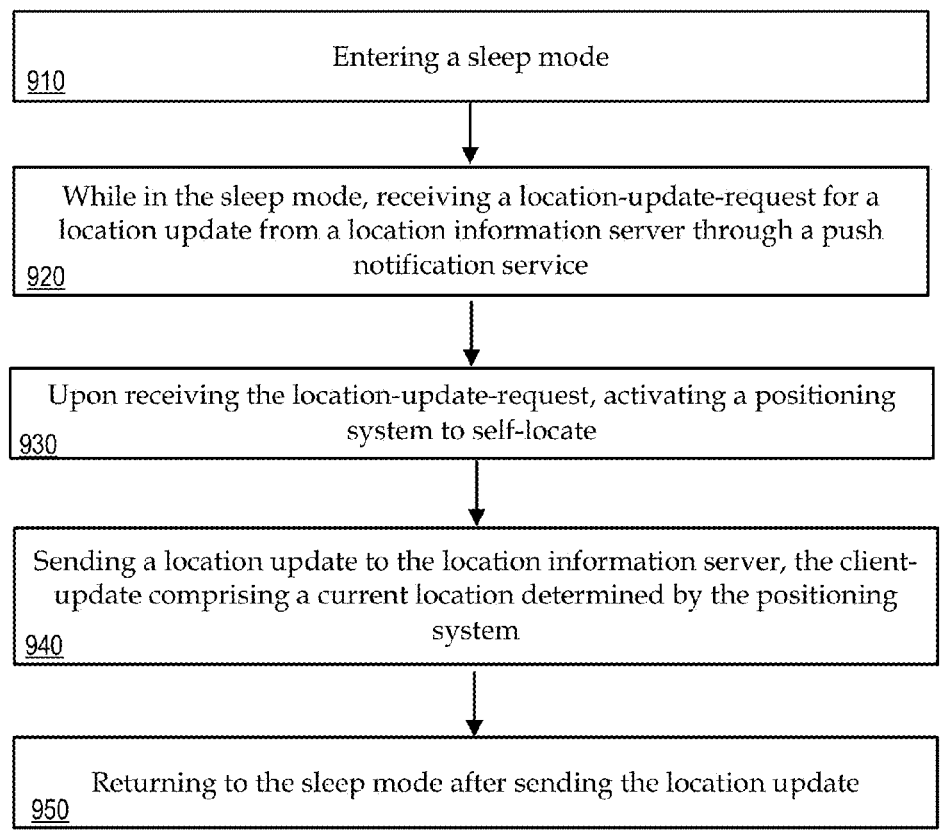
FIG. 9 is a flow diagram of an example process for submitting a location update in response to a pushed location-update-request.

FIG. 9 is a flow diagram of an example process 900 for submitting location update by a location-aware mobile device in response to pushed location-update-request.

First, the location-aware mobile device can enter a sleep mode (910). The sleep mode may denote a state of the mobile device in which the positioning capabilities and location update capabilities have been shutdown or reduced. In some implementations, the sleep mode may denote a state of the mobile device in which the main processor of the mobile device has been shutdown. While in the sleep mode, the location-aware mobile device receives a location-update-request for a location update from a location-information server through a push notification service (920). The mobile device can keep a persistent connection open to the push notification server, and the pushed notification is capable of waking up the location-aware mobile device from the sleep mode. Upon receiving the location-update-request, the location-aware mobile device can activate a positioning system to self-locate (930). Once the location-aware mobile device has obtained a location using the self-location function, the location-aware mobile device can send a location update to the location information server (940). The client-update comprises a current location determined by the positioning system. The location-aware mobile device can return to the sleep mode after sending the location update (950).

In some implementations, the location-update-request can specify a location precision requirement for the location update. The location-aware mobile device can select an appropriate positioning system to activate based on the location precision requirement and according to one or more predetermined criteria. In some implementations, the one or more predetermined criteria can specify a low power consumption preference for the positioning system to be selected. In some implementations, the location-update-request can be sent in response to a location-information-request for location information made by a friend device of the location aware mobile device. The location-update-request can include context information related to the location-information-request, and the one or more predetermined criteria can specify a location precision preference for the positioning system to be selected based on the context information.

Figure 10:
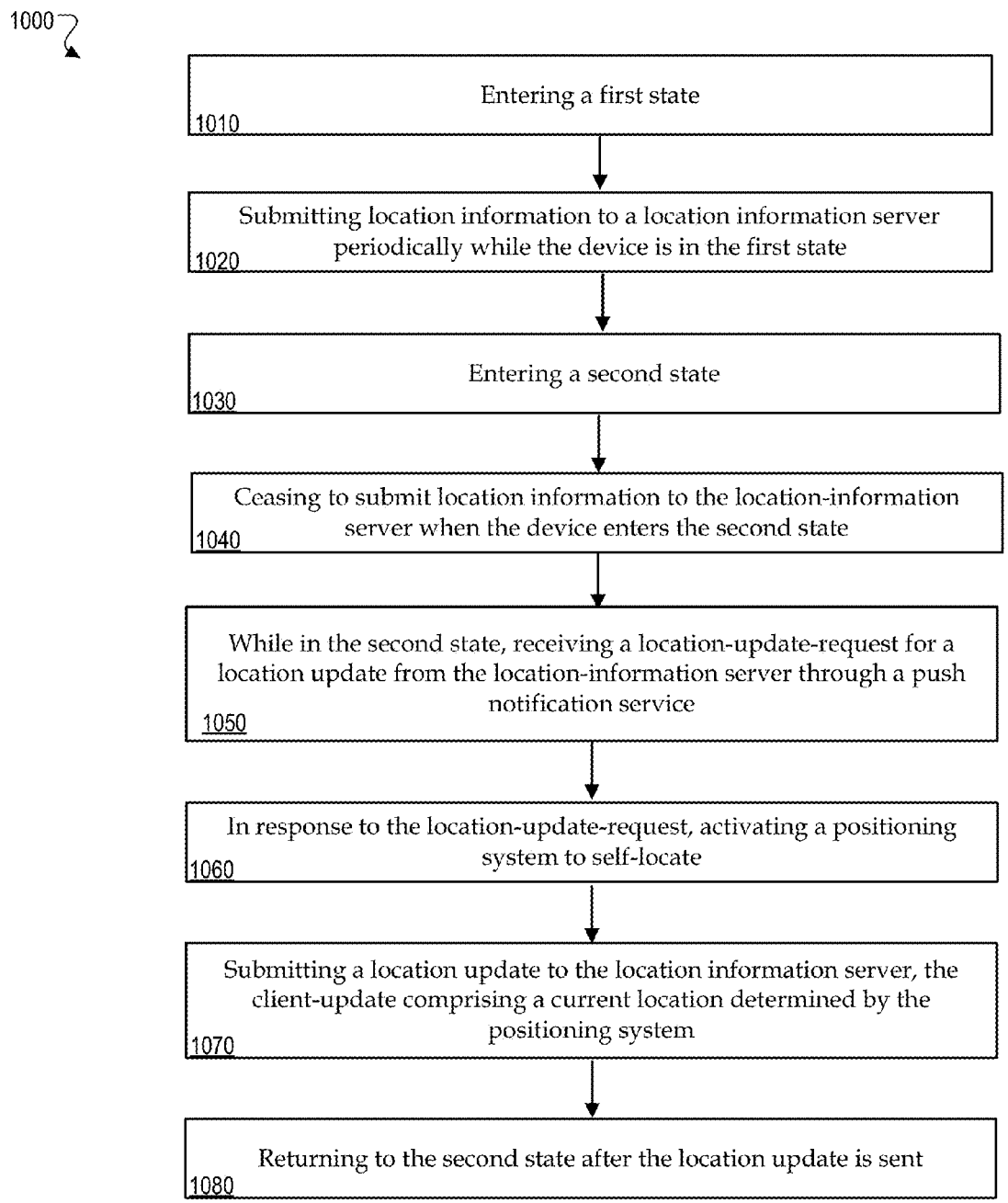
FIG. 10 is a flow diagram of an example process for switching between a self-initiated-location-update mode and a push-based-location-update mode depending on the state of the mobile device.

FIG. 10 is a flow diagram of an example process 1000 for switching between a self-initiated-location-update mode and a push-based-location-update mode depending on the state of the mobile device.

First, the mobile device can enter a first state (1010). The first state can be a state in which the mobile device is already in active communication with the location-information server. For example, the mobile device is in the first state when a user of the mobile device starts the maps application and/or the dedicated location-sharing application. For another example, the mobile device is in the first state when the user of the mobile device is reviewing the location-sharing friend list.

The mobile device can submit location information (location updates) to the location information server periodically, or in response to a trigger event (e.g., a significant change in location has occurred), while the device is in a first state (1020). For example, the mobile device can submit its own locations every 30 seconds, or whenever it is sending a location-information request for location information of a friend device. The trigger events do not include a receiving a pushed location-update-request from the location-information server through a push notification service.

The mobile device can then enter a second state (1030). The second state is a state in which the mobile device is no longer in active communication with the location-information server, for example, after the user has exited the location-sharing application, the maps application, and other location-related applications. The mobile device can also enter the second state, when the mobile device goes into sleep. For example, some mobile devices can automatically shutdown their main processor to conserve power when the mobile device has been idle for a predetermined period of time. The mobile device can cease to submit location information (location updates) to the location-information server when the device enters the second state (1040).

While in the second state, the mobile device can receive a location-update-request for a location update from the location-information server through a push notification service (1050). In response to the location-update-request, the mobile device can activate a positioning system to self-locate (1060). After an updated location is determined, the mobile device can submit a location update to the location-information server (1070). The location update can include a current location determined by the positioning system. The mobile device can return to the second state after the location update is sent (1080).

Example Network Operating Environment

Figure 11:
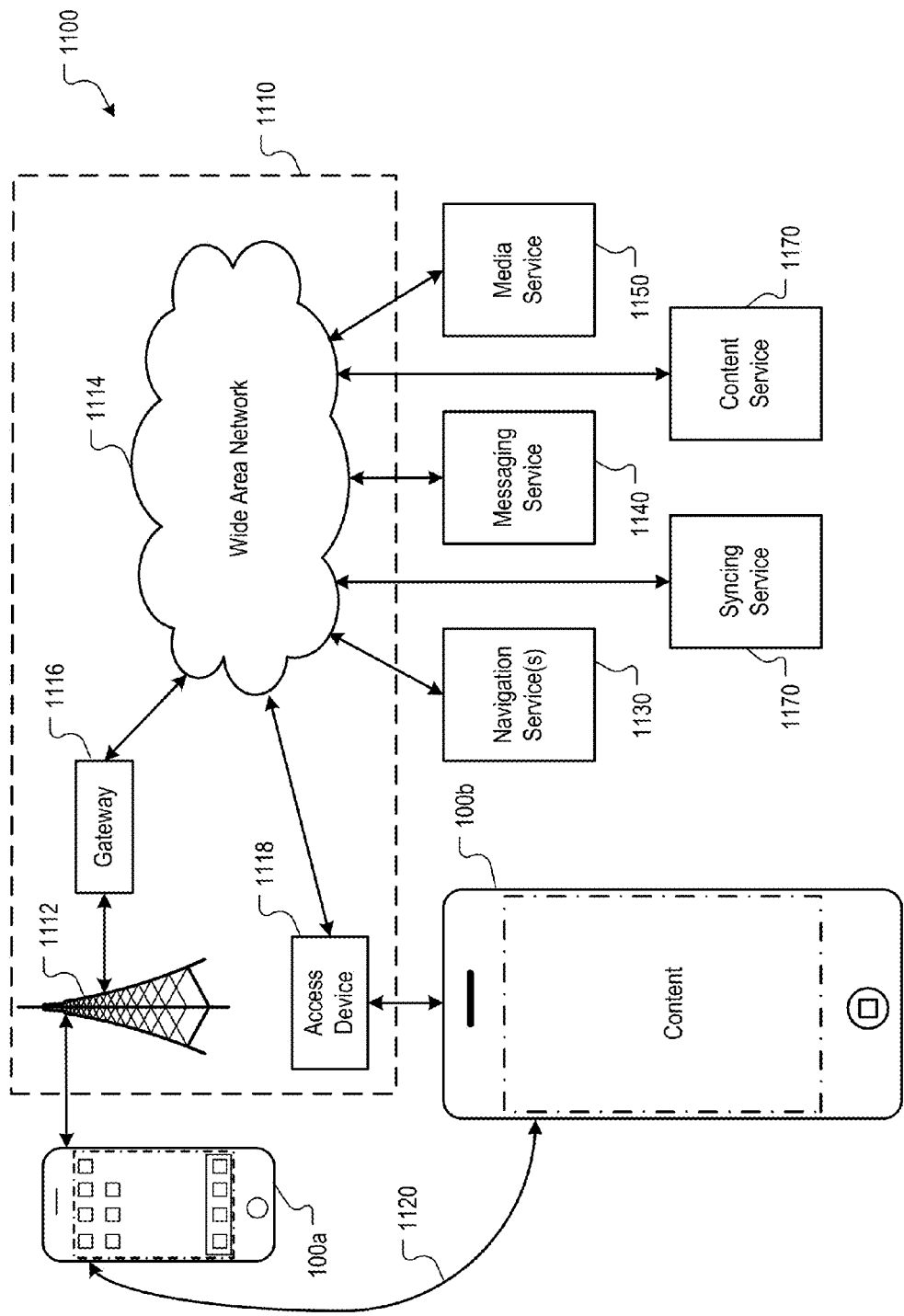
FIG. 11 is a block diagram of an example mobile device operating environment.

FIG. 11 is a block diagram 1100 of an example of a mobile device operating environment. The mobile device 100 of FIG. 1 (shown as 100a or 100b here) can, for example, communicate over one or more wired and/or wireless networks 1110 in data communication. For example, wireless network 1112 (e.g., a cellular network), can communicate with wide area network (WAN) 1114, such as the Internet, by use of gateway 1116. Likewise, access point 1118, such as an 802.11g wireless access point, can provide communication access to the wide area network 1114. In some implementations, both voice and data communications can be established over the wireless network 1112 and the access point 1118. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 1112, gateway 1116, and wide area network 1114 (e.g., using TCP/IP or UDP protocols). Likewise, the mobile device 100b can place and receive phone calls, send and receive e-mail messages, and retrieve electronic documents over the access point 1118 and the wide area network 1114. In some implementations, the mobile device 100b can be physically connected to the access point 1118 using one or more cables and the access point 1118 can be a personal computer. In this configuration, the mobile device 100 can be referred to as a "tethered" device.

The mobile devices 100a and 100b can also establish communications by other means (e.g., wireless communications). For example, the mobile device 100a can communicate with other mobile devices (e.g., other wireless devices, cell phones, etc.), over the wireless network 1112. Likewise, the mobile devices 100a and 100b can establish peer-to-peer communications 1120 (e.g., a personal area network), by use of one or more communication subsystems (e.g., a Bluetooth™ communication device). Other communication protocols and topologies can also be implemented.

The mobile device 100a or 100b can, for example, communicate with one or more services 1130, 1140, 1150, 1160, and 1170 over the one or more wired and/or wireless networks 1110. For example, navigation service 1130 can provide navigation information (e.g., map information, location information, route information, and other information), to the mobile device 100a or 100b. Access to a service can be provided by invocation of an appropriate application or functionality on the mobile device. For example, to invoke the navigation service 1130, a user can invoke a Maps function or application by touching the Maps object 114 depicted in FIG. 1. Messaging service 1140 can, for example, provide e-mail and/or other messaging services. Media service 1150 can, for example, provide access to media files, such as song files, movie files, video clips, and other media data. Syncing service 1160 can, for example, perform syncing services (e.g., sync files). Content service 1170 can, for example, provide access to content publishers such as news sites, RSS feeds, web sites, blogs, social networking sites, developer networks, etc. Other services can also be provided, including a software update service that automatically determines whether software updates exist for software on the mobile device, then downloads the software updates to the mobile device where it can be manually or automatically unpacked and/or installed. Other services such as location-sharing services can also be provided.

Example Mobile Device Architecture

Figure 12:
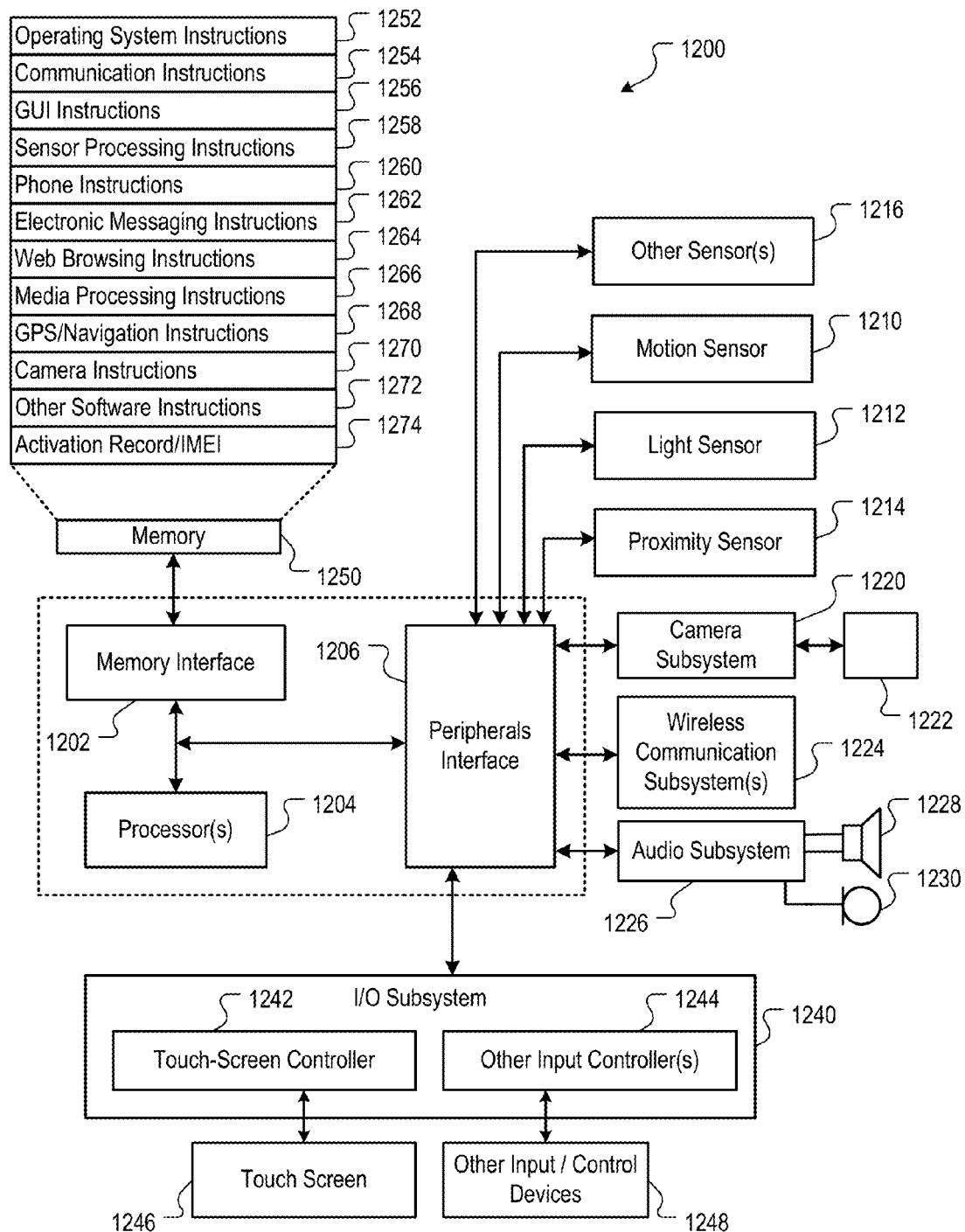
FIG. 12 is a block diagram of an example implementation of the mobile device of FIG. 1.

FIG. 12 is a block diagram 1200 of an example implementation of the mobile device 100 of FIG. 1. The mobile device 100 can include memory interface 1202, one or more data processors, image processors and/or central processing units 1204, and peripherals interface 1206. The memory interface 1202, the one or more processors 1204 and/or the peripherals interface 1206 can be separate components or can be integrated in one or more integrated circuits. The various components in the mobile device 100 can be coupled by one or more communication buses or signal lines.

Sensors, devices, and subsystems can be coupled to the peripherals interface 1206 to facilitate multiple functionalities. For example, motion sensor 1210, light sensor 1212, and proximity sensor 1214 can be coupled to the peripherals interface 1206 to facilitate orientation, lighting, and proximity functions. Other sensors 1216 can also be connected to the peripherals interface 1206, such as a positioning system (e.g., GPS receiver), a temperature sensor, a biometric sensor, or other sensing device, to facilitate related functionalities.

Camera subsystem 1220 and optical sensor 1222 (e.g., a charged coupled device (CCD) or a complementary metal-oxide semiconductor (CMOS) optical sensor), can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters. The specific design and implementation of the communication subsystem 1224 can depend on the communication network (s) over which the mobile device 100 is intended to operate. For example, a mobile device 100 may include communication subsystems 1224 designed to operate over a GSM network, a GPRS network, an EDGE network, a Wi-Fi or WiMax network, and a Bluetooth™ network. In particular, the wireless communication subsystems 1824 may include hosting protocols such that the device 100 may be configured as a base station for other wireless devices.

Audio subsystem 1226 can be coupled to speaker 1228 and microphone 1230 to facilitate voice-enabled functions, such as voice recognition, voice replication, digital recording, and telephony functions.

The I/O subsystem 1240 can include touch screen controller 1242 and/or other input controller(s) 1244. The touch-screen controller 1242 can be coupled to touch screen 1246. The touch screen 1246 and touch screen controller 1242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1246.

The other input controller(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of the speaker 1228 and/or the microphone 1230.

In one implementation, a pressing of the button for a first duration may disengage a lock of the touch screen 1246; and a pressing of the button for a second duration that is longer than the first duration may turn power to the mobile device 100 on or off. The user may be able to customize a functionality of one or more of the buttons. The touch screen 1246 can, for example, also be used to implement virtual or soft buttons and/or a keypad or keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 30-pin dock connector that is compatible with the iPod. Other input/output and control devices can also be used.

The memory interface 1202 can be coupled to memory 1250. The memory 1250 can include high-speed random access memory and/or non-volatile memory, such as one or more magnetic disk storage devices, one or more optical storage devices, and/or flash memory (e.g., NAND, NOR). The memory 1250 can store an operating system 1252, such as Darwin, RTXC, LINUX, UNIX, OS X, WINDOWS, or an embedded operating system such as VxWorks. The operating system 1252 may include instructions for handling basic system services and for performing hardware dependent tasks.

The memory 1250 may also store communication instructions 1254 to facilitate communicating with one or more additional devices, one or more computers and/or one or more servers. The memory 1250 may include graphical user interface instructions 1256 to facilitate graphic user interface processing. For example, the graphical user interfaces described with respect to FIGS. 1-4E can be implemented with graphic user interface instructions 1256. The memory 1250 may also include sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1864 to facilitate web browsing-related processes and functions; media processing instructions 1266 to facilitate media processing-related processes and functions; GPS/Navigation instructions 1268 to facilitate GPS and navigation-related processes and instructions; camera instructions 1270 to facilitate camera-related processes and functions; and/or other icon process instructions 1272 to facilitate processes and functions.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions of the mobile device 100 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a composition of matter capable of effecting a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A non-transitory computer-readable medium storing instructions executable by one or more processors to perform operations comprising:
   maintaining a persistent connection of a mobile device to a push notification service;
   entering a sleep mode of the mobile device;
   while in the sleep mode, receiving a first location-update-request for a location update from a location information server through the push notification service;
   in response to receiving the first location-update-request, waking up the mobile device from the sleep mode;
   obtaining a location of the mobile device by implementing a self-location function;
   sending the location as a location update to the location information server in response to receiving the first location-update-request;
   storing the location obtained by implementing the self-location function;
   receiving a second location-update-request after receiving the first location-update-request;

determining that a time interval between obtaining the location in response to the first location-update-request and receiving the second location-update-request is less than a threshold time interval;

in response to determining that the time interval is less than the threshold time interval, sending the stored location in response to receiving the second location-update-request; and returning the mobile device to the sleep mode after sending the location update.

2. The medium of claim 1, wherein the first location-update-request specifies a location precision requirement for the location update, and wherein obtaining the location of the mobile device by implementing the self-location function comprises selecting an appropriate positioning system to activate based on the location precision requirement and one or more predetermined criteria.

3. The medium of claim 2, wherein the one or more predetermined criteria can specify a low power consumption preference for the positioning system to be selected.

4. The medium of claim 2, wherein the first location-update-request is sent in response to a location-information-request for location information made by a friend device of the mobile device.

5. The medium of claim 4, wherein the first location-update-request includes context information related to the location-information-request and wherein the one or more predetermined criteria specify a location precision preference for the positioning system to be selected based on the context information.

6. The medium of claim 1, wherein the operations further comprise:

receiving a third location-update-request after receiving the first location-update-request;

determining that a time interval between obtaining the location in response to the first location-update-request and receiving the third location-update-request is greater than a threshold time interval;

in response to determining that the time interval is greater than the threshold time interval, implementing the self-location function to obtain a location; and sending the location in response to receiving the third location-update-request.

7. A system comprising:

one or more processors; and a non-transitory computer-readable medium storing instructions executable by the one or more processors to perform operations comprising:

maintaining a persistent connection of a mobile device to a push notification service;

receiving a first location-update-request for a location update from a location information server through the push notification service;

in response to receiving the first location-update-request, obtaining a location of the mobile device by implementing a self-location function;

sending the location as a location update to the location information server in response to receiving the first location-update-request;

storing the location obtained by implementing the self-location function;

receiving a second location-update-request after receiving the first location-update-request;

determining that a time interval between obtaining the location in response to the first location-update-request and receiving the second location-update-request is less than a threshold time interval; and in response to determining that the time interval is less than the threshold time interval, sending the stored location in response to receiving the second location-update-request.

8. The system of claim 7, wherein the first location-update-request specifies a location precision requirement for the location update, and wherein obtaining the location of the mobile device by implementing the self-location function comprises selecting an appropriate positioning system to activate based on the location precision requirement and one or more predetermined criteria.

9. The system of claim 8, wherein the one or more predetermined criteria can specify a low power consumption preference for the positioning system to be selected.

10. The system of claim 8, wherein the first location-update-request is sent in response to a location-information-request for location information made by a friend device of the mobile device.

11. The system of claim 10, wherein the first location-update-request includes context information related to the location-information-request and wherein the one or more predetermined criteria specify a location precision preference for the positioning system to be selected based on the context information.

12. The system of claim 7, wherein the operations further comprise:

receiving a third location-update-request after receiving the first location-update-request;

determining that a time interval between obtaining the location in response to the first location-update-request and receiving the third location-update-request is greater than a threshold time interval;

in response to determining that the time interval is greater than the threshold time interval, implementing the self-location function to obtain a location; and sending the location in response to receiving the third location-update-request.

13. A method comprising:

maintaining, by one or more processors, a persistent connection of a mobile device to a push notification service;

entering, by the one or more processors, a sleep mode of the mobile device;

while in the sleep mode, receiving, by the one or more processors, a first location-update-request for a location update from a location information server through the push notification service;

in response to receiving the first location-update-request, waking up, by the one or more processors, the mobile device from the sleep mode;

obtaining, by the one or more processors, a location of the mobile device by implementing a self-location function;

sending, by the one or more processors, the location as a location update to the location information server in response to receiving the first location-update-request;

storing, by the one or more processors, the location obtained by implementing the self-location function;

receiving, by the one or more processors, a second location-update-request after receiving the first location-update-request;

determining, by the one or more processors, that a time interval between obtaining the location in response to the first location-update-request and receiving the second location-update-request is less than a threshold time interval; and in response to determining that the time interval is less than the threshold time interval, sending, by the one or more processors, the stored location in response to receiving the second location-update-request; and returning, by the one or more processors, the mobile device to the sleep mode after sending the location update.

14. The method of claim 13, wherein the first location-update-request specifies a location precision requirement for the location update, and wherein obtaining the location of the mobile device by implementing the self-location function comprises selecting an appropriate positioning system to activate based on the location precision requirement and one or more predetermined criteria.

15. The method of claim 14, wherein the one or more predetermined criteria can specify a low power consumption preference for the positioning system to be selected.

16. The method of claim 14, wherein the first location-update-request is sent in response to a location-information-request for location information made by a friend device of the mobile device, wherein the first location-update-request includes context information related to the location-information-request and wherein the one or more predetermined criteria specify a location precision preference for the positioning system to be selected based on the context information.

17. The method of claim 13, further comprising:
receiving a second location-update-request after receiving the first location-update-request;
determining that a time interval between obtaining the location in response to the first location-update-request and receiving the second location-update-request is greater than a threshold time interval;
in response to determining that the time interval is greater than the threshold time interval, implementing the self-location function to obtain a location; and
sending the location in response to receiving the second location-update-request.

18. The medium of claim 1, wherein the operations comprise:
determining that the time interval is not less than the threshold time interval;
in response to determining that the time interval is not less than the threshold time interval, implementing the self-location function to obtain a current location; and
sending the current location in response to receiving the second location-update-request.

19. The system of claim 7, wherein the operations comprise:
before receiving the first location-update-request, entering the mobile device into a sleep mode, wherein the first location-update-request is received while in the sleep mode;
waking up the mobile device from the sleep mode in response to receiving the first location-update-request; and
returning the mobile device to the sleep mode after sending the location update.

* * * * *